United States Patent
Jang et al.

(10) Patent No.: US 11,503,540 B2
(45) Date of Patent: Nov. 15, 2022

(54) METHOD AND APPARATUS FOR CONTROLLING DORMANT STATE OF SECONDARY CELL IN NEXT-GENERATION MOBILE COMMUNICATION SYSTEM

(71) Applicant: Samsung Electronics Co., Ltd., Suwon-si (KR)

(72) Inventors: Jaehyuk Jang, Suwon-si (KR); Beomsik Bae, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 16/744,098

(22) Filed: Jan. 15, 2020

(65) Prior Publication Data

US 2020/0229082 A1 Jul. 16, 2020

(30) Foreign Application Priority Data

Jan. 15, 2019 (KR) ........................ 10-2019-0005375

(51) Int. Cl.
*H04W 52/02* (2009.01)
*H04W 4/40* (2018.01)
(Continued)

(52) U.S. Cl.
CPC ......... *H04W 52/0206* (2013.01); *H04W 4/40* (2018.02); *H04W 72/042* (2013.01); *H04W 72/14* (2013.01)

(58) Field of Classification Search
CPC . H04W 52/0206; H04W 4/40; H04W 72/042; H04W 72/14; H04W 16/08; H04W 76/15; Y02D 30/70
See application file for complete search history.

(56) References Cited

U.S. PATENT DOCUMENTS 8,873,413 B2 10/2014 Jang et al.
2015/0215929 A1 7/2015 Damnjanovic et al.
(Continued)

FOREIGN PATENT DOCUMENTS

CN 103384971 A 11/2013
EP 3182789 B1 * 7/2018 ............ H04W 36/04

OTHER PUBLICATIONS

Nokia, "Signaling for euCA (Enhancing LTE CA Utilization)", Sep. 10-13, 2018, 3GPP, RP-182006 (Year: 2018).*
(Continued)

*Primary Examiner* — Michael K Phillips

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Provided are a method and an apparatus for allocating V2X resources of an SN to a UE in a dual connectivity supporting network and also a method and an apparatus for controlling a dormant state of an SCell.

20 Claims, 29 Drawing Sheets

(51) Int. Cl.
*H04W 72/04* (2009.01)
*H04W 72/14* (2009.01)

(56) References Cited

U.S. PATENT DOCUMENTS

| | | | |
|---|---|---|---|
| 2018/0077643 A1 | 3/2018 | Dinan | |
| 2019/0021052 A1* | 1/2019 | Kadiri | H04W 76/27 |
| 2019/0208429 A1* | 7/2019 | Hong | H04W 24/02 |
| 2020/0029316 A1* | 1/2020 | Zhou | H04W 72/042 |
| 2020/0053799 A1* | 2/2020 | Jeon | H04W 16/14 |
| 2020/0092814 A1* | 3/2020 | Zhou | H04W 80/02 |
| 2020/0275485 A1* | 8/2020 | Babaei | H04W 74/004 |
| 2021/0051759 A1* | 2/2021 | Zhou | H04W 72/042 |
| 2021/0185614 A1* | 6/2021 | Zhou | H04L 5/0051 |
| 2022/0116874 A1* | 4/2022 | Xu | H04W 28/0278 |

OTHER PUBLICATIONS

International Search Report and Written Opinion of the International Searching Authority in connection with International Application No. PCT/KR2020/000678 dated Apr. 20, 2020, 7 pages.
Huawei, et al., "SkipUplinkTxSPS for short TTI option 1," R2-1817427, 3GPP TSG-RAN WG2 Meeting #104, Spokane, USA, Nov. 12-16, 2018, 8 pages.
Nokia, et al., "Corrections to euCA," R2-1816591 R2-1815772, 3GPP TSG-RAN WG2 Meeting #104, Spokane, USA, Nov. 12-16, 2018, 3 pages.
3GPP TS 36.321 V15.4.0 (Dec. 2018), Technical Specification, 3rd Generation Partnership Project; Technical Specification Group Radio Access Network; Evolved Universal Terrestrial Radio Access (E-UTRA); Medium Access Control (MAC) protocol specification (Release 15), Dec. 2018, 131 pages.
European Patent Office, "Supplementary European Search Report" dated Aug. 30, 2021, in connection with counterpart European Patent Application No. 20742076.1, 11 pages.
Nokia et al: "Corrections to euCA" 3GPP TSG-RAN WG2 Meeting #103bis, R2-1813769, Chengdu, China, Oct. 8-12, 2018, 6 pages.
3GPP TS 36.321, V15.4.0 (Dec. 2018); Technical Specification; 3rd Generation Partnership Project; Technical Specification Group Radio Access Network; Evolved Universal Terrestrial Radio Access (E-UTRA); Medium Access Control (MAC) protocol specification (Release 15), 131 pages.

* cited by examiner

FIG. 10A 10-100

SystemInformationBlockType21

The IE SystemInformationBlockType21 contains V2X sidelink communication configuration.

SystemInformationBlockType21 information element

-- ASN1START

SystemInformationBlockType21-r14 ::= SEQUENCE {
    sl-V2X-ConfigCommon-r14        SL-V2X-ConfigCommon-r14        OPTIONAL,    -- Need OR
    lateNonCriticalExtension         OCTET STRING                  OPTIONAL,
    ...
}

SL-V2X-ConfigCommon-r14 ::=    SEQUENCE {
    v2x-CommRxPool-r14            SL-CommRxPoolListV2X-r14       OPTIONAL,    -- Need OR
    v2x-CommTxPoolNormalCommon-r14    SL-CommTxPoolListV2X-r14       OPTIONAL,    -- Need OR
    p2x-CommTxPoolNormalCommon-r14    SL-CommTxPoolListV2X-r14       OPTIONAL,    -- Need OR
    v2x-CommTxPoolExceptional-r14     SL-CommResourcePoolV2X-r14     OPTIONAL,    -- Need OR
    v2x-SyncConfig-r14            SL-SyncConfigListV2X-r14       OPTIONAL,    -- Need OR
    v2x-InterFreqInfoList-r14       SL-InterFreqInfoListV2X-r14    OPTIONAL,    -- Need OR
    v2x-ResourceSelectionConfig-r14   SL-CommTxPoolSensingConfig-r14  OPTIONAL,    -- Need OR
    zoneConfig-r14                SL-ZoneConfig-r14             OPTIONAL,    -- Need OR
    typeTxSync-r14                SL-TypeTxSync-r14             OPTIONAL,    -- Need OR
    thresSL-TxPrioritization-r14      SL-Priority-r13               OPTIONAL,    -- Need OR
    anchorCarrierFreqList-r14       SL-AnchorCarrierFreqList-V2X-r14 OPTIONAL,    -- Need OR
    offsetDFN-r14                 INTEGER (0..1000)             OPTIONAL,    -- Need OR
    cbr-CommonTxConfigList-r14      SL-CBR-CommonTxConfigList-r14   OPTIONAL,    -- Need OR
}

-- ASN1STOP

FIG. 10B 10-110

- SystemInformationBlockType26

The IE SystemInformationBlockType26 contains V2X sidelink communication configurations which can be used jointly with those included in SystemInformationBlockType21.

SystemInformationBlockType26 information element

-- ASN1START

SystemInformationBlockType26-r15 ::= SEQUENCE {
    v2x-InterFreqInfoList-r15    SL-InterFreqInfoListV2X-r14    OPTIONAL,  -- Need OR
    cbr-pssch-TxConfigList-r15    SL-CBR-PPPP-TxConfigList-r15    OPTIONAL,  -- Need OR
    v2x-PacketDuplicationConfig-r15    SL-V2X-PacketDuplicationConfig-r15    OPTIONAL,  -- Need OR
    syncFreqList-r15    SL-V2X-SyncFreqList-r15    OPTIONAL,  -- Need OR
    slss-TxMultiFreq-r15    ENUMERATED{true}    OPTIONAL,  -- Need OR
    v2x-FreqSelectionConfigList-r15    SL-V2X-FreqSelectionConfigList-r15    OPTIONAL,  -- Need OR
    threshS-RSSI-CBR-r14    INTEGER (0..45)    OPTIONAL,  -- Need OR
    ...
}

-- ASN1STOP

FIG. 1PA

| IE/Group Name | Presence | Range | IE type and reference | Semantics description | Criticality | Assigned Criticality |
|---|---|---|---|---|---|---|
| ■ | | | [..] | | | |
| ■ V2X Resource | 0 | | | | YES | reject |
| ■ | | | [..] | | | |

(a) configuration of V2X resource allocation IE in units of SNs or SN-DUs (1p-110)

FIG. 1PB

| IE/Group Name | Presence | Range | IE type and reference | Semantics description | Criticality | Assigned Criticality |
|---|---|---|---|---|---|---|
| ■ [...] | | | | | | |
| ■ List of Served Cells NR | | 0...<maxnoofCellsinNG-RAN node> | | Complete list of cells served by the gNB | YES | reject |
| ■ >NR-PCI | M | | INTEGER (0..1007,...) | NR Physical Cell ID | - | |
| ■ >NR-CGI | M | | 9.2.2.7 | | - | |
| ■ >TAC | M | | 9.2.2.5 | Tracking Area Code | - | |
| ■ >RANAC | O | | RAN Area Code 9.2.2.6 | | | |
| ■ >BroadcastPLMNs | | 1..<maxnoofBPLMNs> | | BroadcastPLMNs | YES | reject |
| ■ >>PLMN Identity | M | | 9.2.2.4 | | EACH | reject |
| ■ >V2X Resource | O | | | | - | |
| ■ [...] | | | | | | |

(b) configuration of V2X resource allocation IE in units of SNs or cells supported by SN-DU (1p-120)

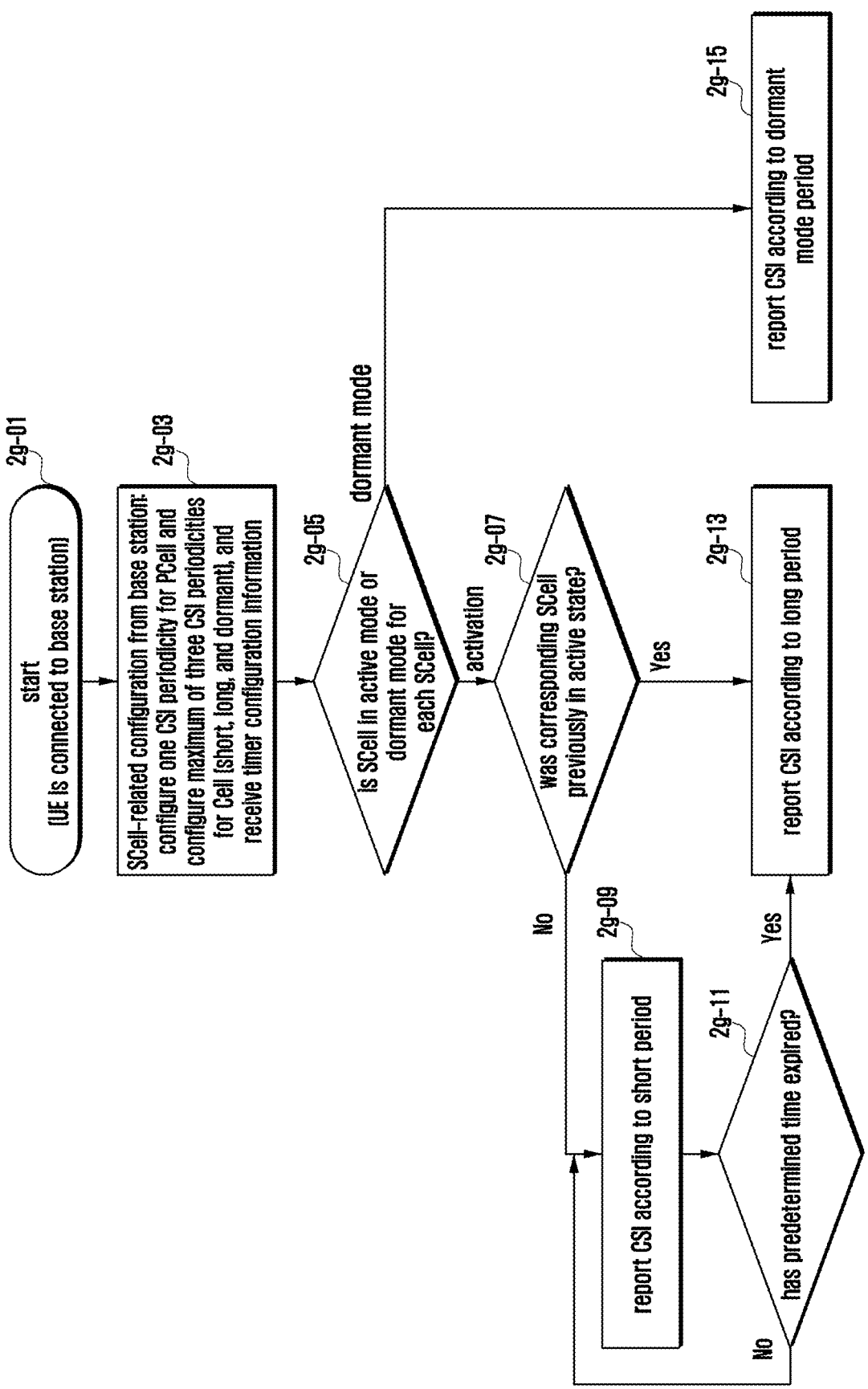

METHOD AND APPARATUS FOR CONTROLLING DORMANT STATE OF SECONDARY CELL IN NEXT-GENERATION MOBILE COMMUNICATION SYSTEM

CROSS-REFERENCE TO RELATED APPLICATION

This application is based on and claims priority under 35 U.S.C. 119 to Korean Patent Application No. 10-2019-0005375 filed on Jan. 15, 2019 in the Korean Intellectual Property Office, the disclosure of which is herein incorporated by reference in its entirety.

BACKGROUND

1. Field

The disclosure relates to operation of a base station and a UE in a mobile communication system, and a method and an apparatus for allocating vehicle to everything (V2X) resources in a secondary node (SN) for a UE in a radio resource control (RRC) idle state in a dual connectivity supporting network. More particularly, the disclosure relates to a method of maintaining a dormant mode (or a dormant state) of a secondary cell (SCell) when carrier aggregation (CA) is used in a wireless communication system, more specifically, in $3^{rd}$ generation partnership project (3GPP) long term evolution (LTE) and 5G new radio (NR) technologies.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G system, supporting of more various services is being considered compared to the conventional 4G system. For example, most representative services may be a ultra wide band mobile communication service (enhanced mobile broad band (eMBB)), a ultra-reliable and low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

The URLLC service is a service newly considered in the 5G system unlike in the conventional 4G system, and requires super-high reliability (for example, a packet error rate of about $10^{-5}$) and low latency (for example, about 0.5 msec) in comparison with other services. In order to meet such strict requirements, the URLLC service may need to apply a shorter transmission time interval (TTI) than the eMBB service, and various operation schemes through the application are being considered.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

According to the recent development of communication systems, research on V2X are being actively conducted in a next-generation mobile communication system. Further, research on management of a dormant mode of a secondary cell is being actively conducted.

The above information is presented as background information only to assist with an understanding of the disclosure. No determination has been made, and no assertion is made, as to whether any of the above might be applicable as prior art with regard to the disclosure.

SUMMARY

An embodiment of the disclosure provides a method and an apparatus for allocating V2X resources in a secondary node (SN) for a UE in an RRC_IDLE state in a dual connectivity resource network.

Further, an embodiment of the disclosure proposes a method of transitioning a non-used secondary cell (SCell) to a dormant mode and deactivating the SCell when the UE uses carrier aggregation (CA). Moreover, a method of reporting a channel state when the activated SCell is reactivated is proposed.

The technical subjects pursued in the disclosure may not be limited to the above mentioned technical subjects, and other technical subjects which are not mentioned may be clearly understood, through the following descriptions, by those skilled in the art of the disclosure.

According to an embodiment of the disclosure, a method and an apparatus for efficiently allocating V2X resources in a secondary node (SN) for a UE in an RRC_IDLE state in a dual connectivity resource network can be provided.

Further, through the disclosure, the UE can reduce power consumption of the non-used SCell and reduce power consumption due to an unnecessary channel state report.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 1OA illustrates an example of V2X resource information transmitted between the MN base station and the SN base station or between the SN-CU and the SN-DU according to an embodiment of the disclosure, and FIG. 1OB illustrates an example of V2X resource information transmitted between the MN base station and the SN base station or between the SN-CU and the SN-DU according to an embodiment of the disclosure;

FIG. 1PA illustrates an example of a V2X resource information element (IE) included in a message used to transmit V2X resource information transmitted between the MN base station and the SN base station or between the SN-CU and the SN-DU according to an embodiment of the disclosure, and FIG. 1PB illustrates an example of a V2X resource information element (IE) included in a message used to transmit V2X resource information transmitted between the MN base station and the SN base station or between the SN-CU and the SN-DU according to an embodiment of the disclosure;

FIG. 2G illustrates a flowchart of the operation of the UE for a CSI report when the SCell is operated when carrier aggregation is used according to an embodiment of the disclosure;

DETAILED DESCRIPTION

Figure 1A:
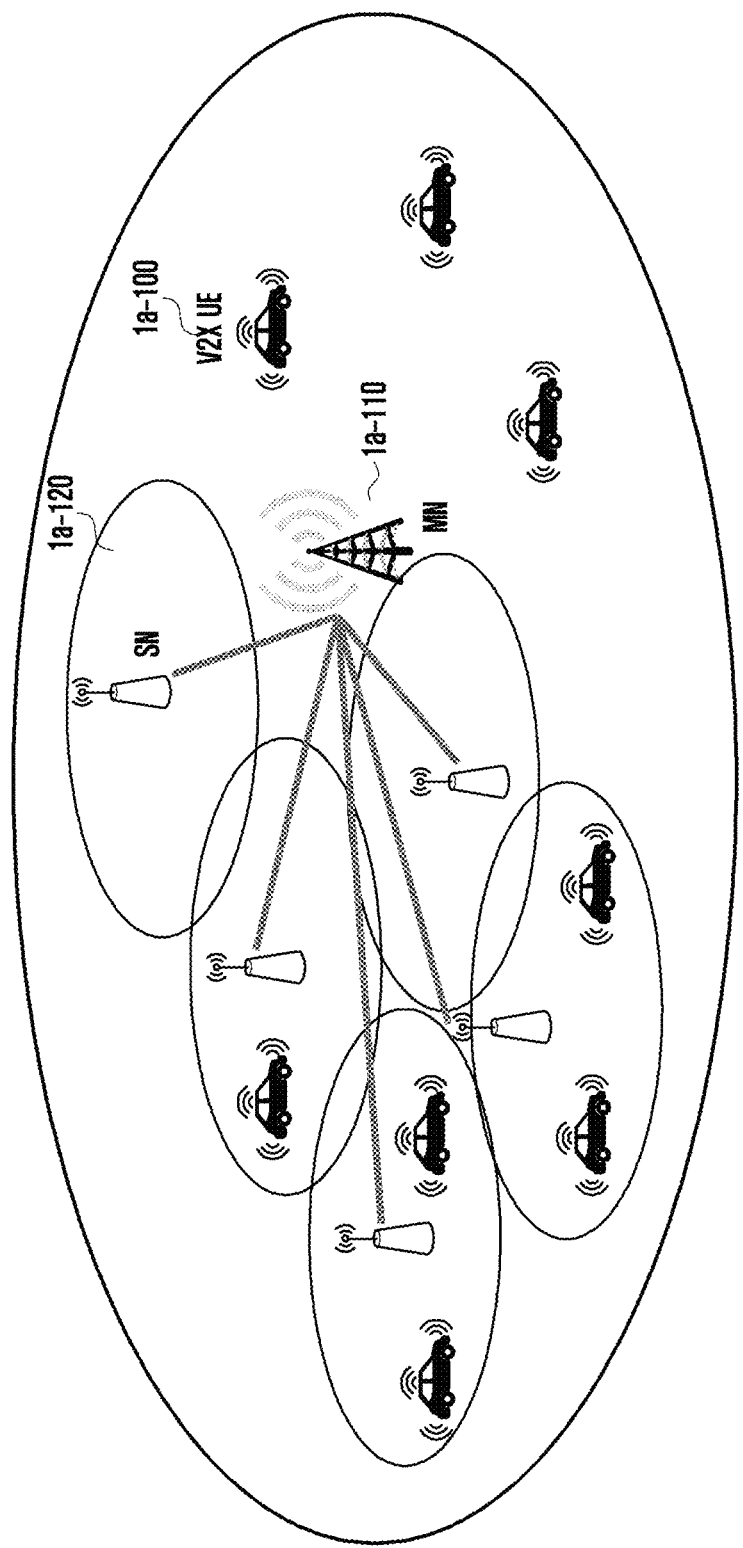
FIG. 1A illustrates an example of coverage of each of a master node (MN) and a secondary node (SN) and an example of a V2X UE in a dual connectivity installation environment including an MN base station and an SN base station according to an embodiment of the disclosure.

FIGS. 1A through 2I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In the following description of the disclosure, a detailed description of known configurations or functions incorporated herein will be omitted when it is determined that the detailed description may make the subject matter of the disclosure unclear. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the following embodiments and may be implemented in various different forms, and the embodiments of the disclosure are provided to make the disclosure perfect and completely inform those skilled in the art of the scope of the disclosure and the disclosure is only defined by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. According to some embodiments, the term "unit" may include one or more processors.

In the following description of the disclosure, a detailed description of known configurations or functions incorporated herein will be omitted when it is determined that the detailed description may make the subject matter of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in LTE and NR standards, which are the latest standards among the existing communication standards defined by $3^{rd}$-generation partnership project (3GPP) organization. However, the disclosure is not limited by the terms and names, and may be equally applied to a system that is based on another standard. Particularly, the disclosure may be applied to 3GPP NR, that is, a $5^{th}$-generation mobile communication standard.

Embodiment 1

FIG. 1A illustrates an example of each of a master node (MN) and a secondary node (SN) and an example of a V2X UE in a dual connectivity installation environment including an MN base station and an SN base station according to an embodiment of the disclosure.

The disclosure presents a mobile communication system in which a V2X UE 1a-100 directly communicates with another V2X UE through V2X resources in a mobile communication network installation environment supporting dual connectivity in which an MN base station 1a-110 and an SN base station 1a-120 exist as illustrated in FIG. 1A. In general, in the dual connectivity network installation environment, coverages in which the MN base station and the SN base station provide services may be different, and there may be an area in which the SN base station fails to provide a service within the coverage of the MN base station according to circumstances. The disclosure may be applied to a UE capable of performing direct communication between UEs in addition to the V2X UE, and the corresponding UE is referred to as a V2X UE for convenience of the disclosure.

Figure 1B:
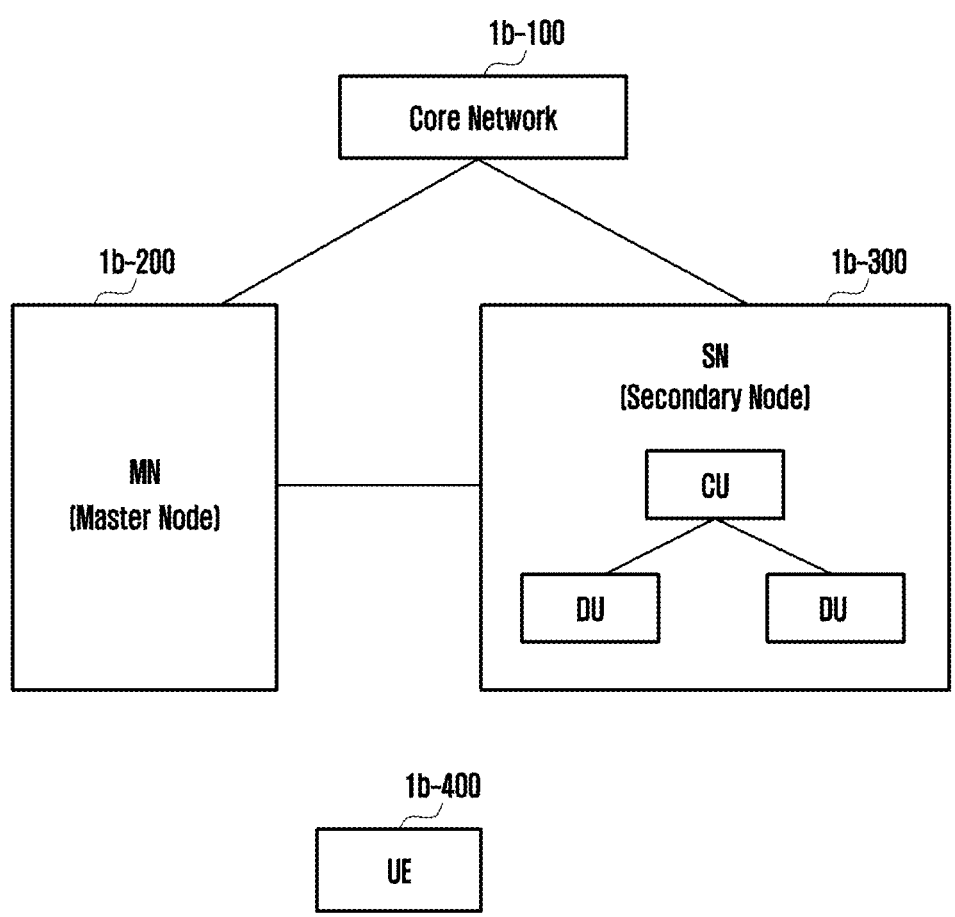
FIG. 1B illustrates an example of a network structure for supporting dual connectivity and an example of a structure of a next-generation mobile communication system according to an embodiment of the disclosure.

FIG. 1B illustrates an example of a network structure for supporting dual connectivity and an example of a structure of a next-generation mobile communication system according to an embodiment of the disclosure.

In the configuration of the system supporting dual connectivity, as illustrated in FIG. 1B, an MN base station 1b-200 and an SN base station 1b-300 may be connected and one MN base station 1b-200 may be connected to a plurality of SN base stations 1b-300. Further, the MN base station 1b-200 and the SN base station 1b-300 are connected to a core network 1b-100. The MN base station 1b-200 and the SN base station 1b-300 may be configured to have separate functions according to a central unit (CU) and a distribution unit (DU), and one CU may be configured to be connected to a plurality of DUs. The technology proposed by the disclosure may be applied to a system environment in which only the MN base station 1b-200 and the SN base station 1b-300 exist and the SN base station 1b-300 is distributed into an SN-CU and an SN-DU, and the MN base station 1b-200 may be a single base station type or a base station type having separate functions.

The disclosure corresponds to a technology for allowing the V2X UE 1b-400 to communicate using V2X resources in a frequency allocated to the SN base station in a dual connectivity network installation environment including the MN base station and the SN base station. To this end, a method of determining V2X resources to be used by the SN base station, a method of transmitting the determined information to the V2X UE, and flowcharts illustrating the operation of the MN base station, the SN base station, and the V2X UE therefor are provided.

The UE in the idle state in the dual connectivity network generally operates through reception of only a system information block (SIB) transmitted by the MN base station but does not receive an SIB transmitted by the SN base station. Accordingly, in order to transmit V2X traffic using V2X resources of the SN base station by the V2X UE in the idle state, V2X resource information of the SN base station should be included in the SIB transmitted by the MN base station, the V2X resources of the SN base station should be determined through a mutual operation between the MN base station and the SN base station, and the determined V2X resource information of the SN base station should be shared between the MN base station and the SN base station. V2X resources may be indicated by a combination of one or more pieces of cell ID information, frequency information, bandwidth information, slot information, physical resource block (PRB) information, resource element (RE) information. The SN base station considers the determined V2X resource information when performing traffic scheduling for serving UEs connected to the SN base station. For example, the SN base station performs scheduling except for the corresponding V2X resources in order to allow the V2X UEs to use the corresponding V2X resources. The V2X UE transmits V2X traffic through the V2X resources of the SN base station after receiving the SIB including the V2X resource information of the SN base station from the MN base station.

Figure 1C:
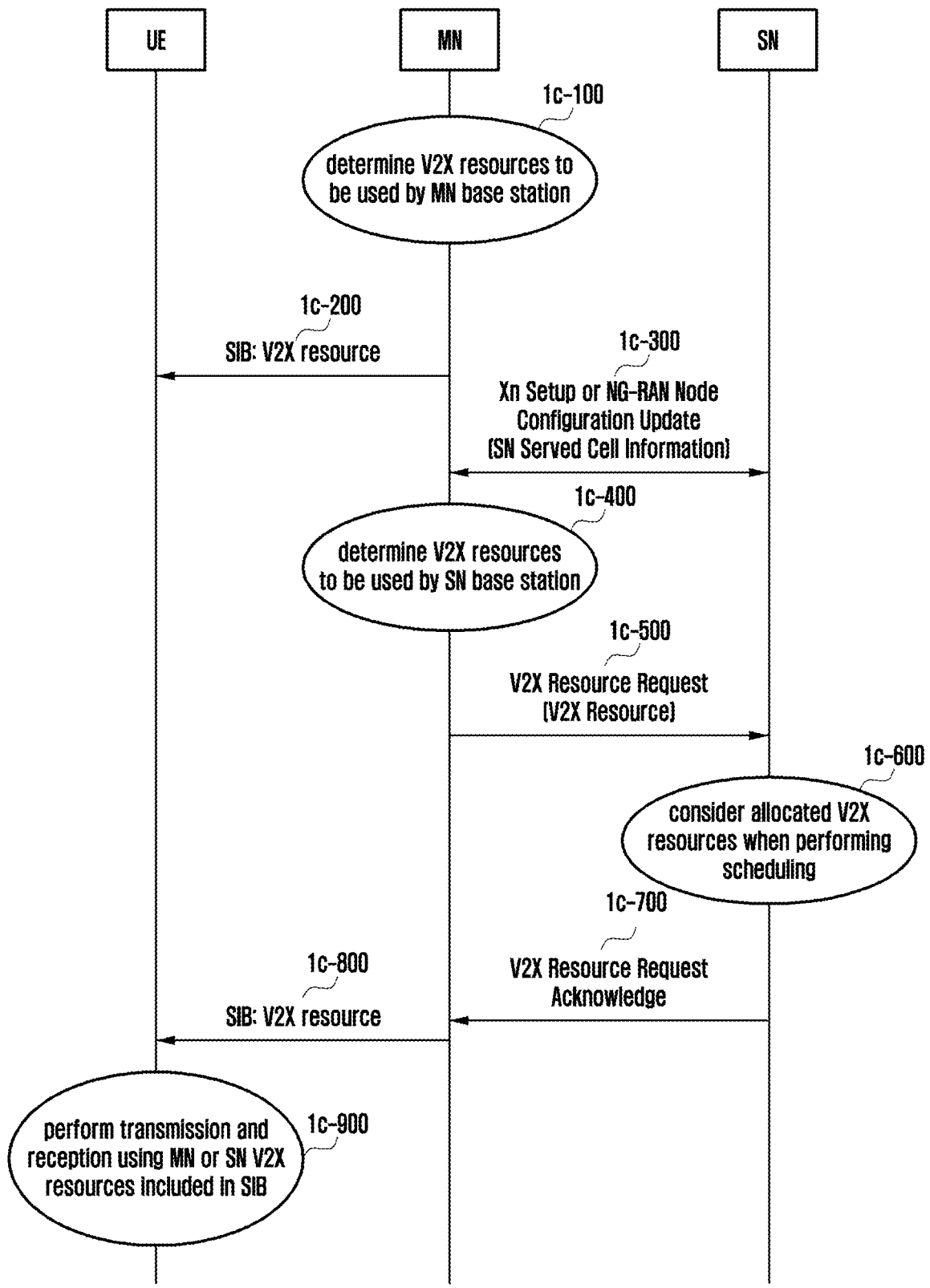
FIG. 1C illustrates a procedure in which the MN base station determines V2X resources to be used by the SN base station, informs the connected SN base station of the determined V2X resources, and supports the V2X UE to communicate using the V2X resources of the SN base station according to an embodiment of the disclosure.

FIG. 1C illustrates an example of a procedure in which the MN base station determines V2X resources to be used by the SN base station and informs the connected SN base station of the V2X resources, and the V2X UE communicates using the V2X resources of the SN base station according to an embodiment of the disclosure.

Referring to FIG. 1C, in step 1c-100, the MN base station determines V2X resources to be used by the MN base station according to a V2X resource allocation policy of the MN base station configured in the MN base station through operation and management (OAM) or other methods. In step 1c-200, the MN base station broadcasts a system information block (SIB) message including MN base station V2X resource information. Further, the MN base station may schedule a V2X transmission request made by the UE through V2X resources to be used by the MN base station. In step 1c-300, the SN base station transfers information on cells served by the SN base station to the MN base station during a procedure for connecting to the MN base station or a process of updating an SN base station parameter. In step 1c-400, the MN base station determines V2X resources to be used by the SN base station according to a V2X resource allocation policy of the SN base station configured in the MN base station on the basis of cell information provided by the SN base station and through OAM or other methods. In step 1c-500, the MN base station transfers the determined V2X resource information of the SN base station to the SN base station, and at this time, the MN base station transfers the determined V2X resources to a plurality of SN base stations associated with the determined V2X resources. A message transmitted in step 1c-500 may be transmitted using non-UE associated signaling or UE associated signaling. The SN base station receiving the V2X resource information to be used by the SN base station from the MN base station configures to perform scheduling in consideration of the corresponding V2X resources when the SN base station performs scheduling for serving UEs in step 1c-600. For example, the SN base station performs scheduling for serving UEs only through resources other than the V2X resources. The SN base station transmits a response message to the MN base station in response to reception and application of the V2X resource information in step 1c-700. After receiving the response message from the SN base station, the MN base station broadcasts a system information block (SIB) message including updated V2X resource information in step 1c-800. Further, the MN base station may schedule a V2X transmission request made by the UE through V2X resources of the SN base station. After the V2X UE identifies the V2X resource information included in the SIB, if V2X traffic transmission/reception is needed, the V2X UE transmits V2X traffic using the V2X resources of the SN base station as necessary in step 1c-900. When V2X resource information or response information is transmitted between the MN base station and the SN base station, a dedicated message for transmitting information related to the V2X resource information may be used, or information related to the V2X resource information may be inserted into a message already defined for another purpose and then transmitted.

Figure 1D:
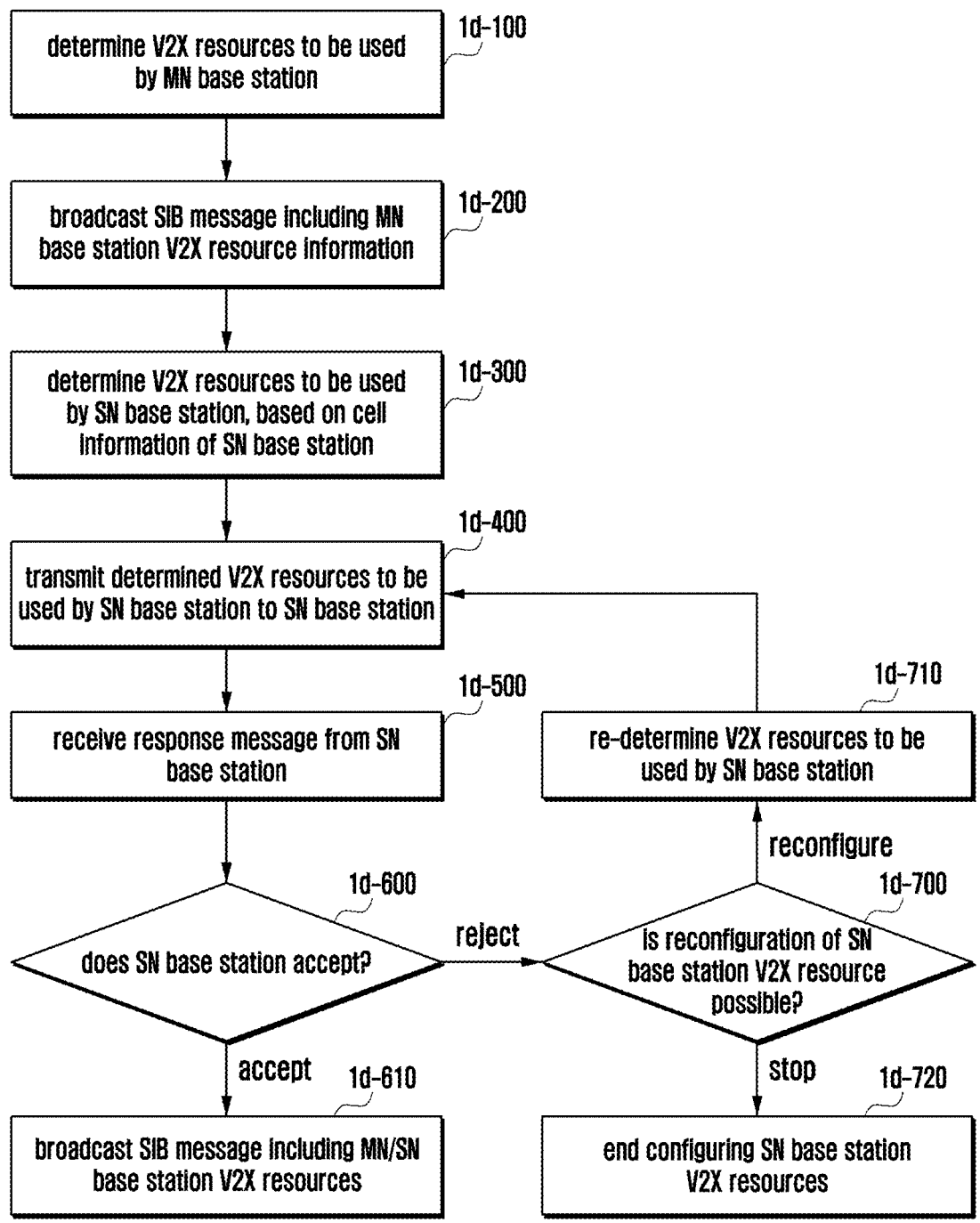
FIG. 1D illustrates a flowchart of an operation of the MN base station when the MN base station determines V2X resources to be used by the SN base station, informs the connected SN base station of the V2X resources, and supports the V2X UE to communicate using the V2X resources of the SN base station according to an embodiment of the disclosure.

FIG. 1D illustrates a flowchart of an operation of the MN base station when the MN base station determines V2X resources to be used by the SN base station, informs the connected SN base station of the V2X resources, and supports the V2X UE to communicate using the V2X resources of the SN base station according to an embodiment of the disclosure.

Referring to FIG. 1D, the MN base station determines V2X resources to be used by the MN base station in step 1d-100, and broadcasts an SIB message including MN base station V2X resource information in step 1d-200. The MN base station determines V2X resources to be used by the SN on the basis of information on SN base station cells received from the SN base station in step 1d-300, and transmit the determined V2X resource information of the SN base station to the SN base station in step 1d-400. After receiving a response message from SN base stations in step 1d-500, the MN base station determines whether the SN base stations accept SN base station V2X resources in step 1d-600. If the SN base stations accept the V2X resources, the MN base station adds V2X resource information of the SN base station into an SIB message transmitted by the MN base station and broadcasts the SIB message to UEs in step 1d-610. Further, the MN base station may schedule a V2X transmission request made by the UE through V2X resources of the SN base station. If the SN base station rejects the V2X resources in step 1d-600, the MN base station determines to reconfigure SN base station V2X resources according to cause information included in a rejection message in step 1d-700, and if it is determined to reconfigure the SN base station V2X resources, the MN base station determines again V2X resources to be used by the SN base station in step 1d-710 and transmits the determined SN base station V2X resource information to the SN base station in step 1d-400. If it is determined not to reconfigure SN base station V2X resources in step 1d-700, the MN base station ends configuring the SN base station V2X resources in step 1d-720.

Figure 1E:
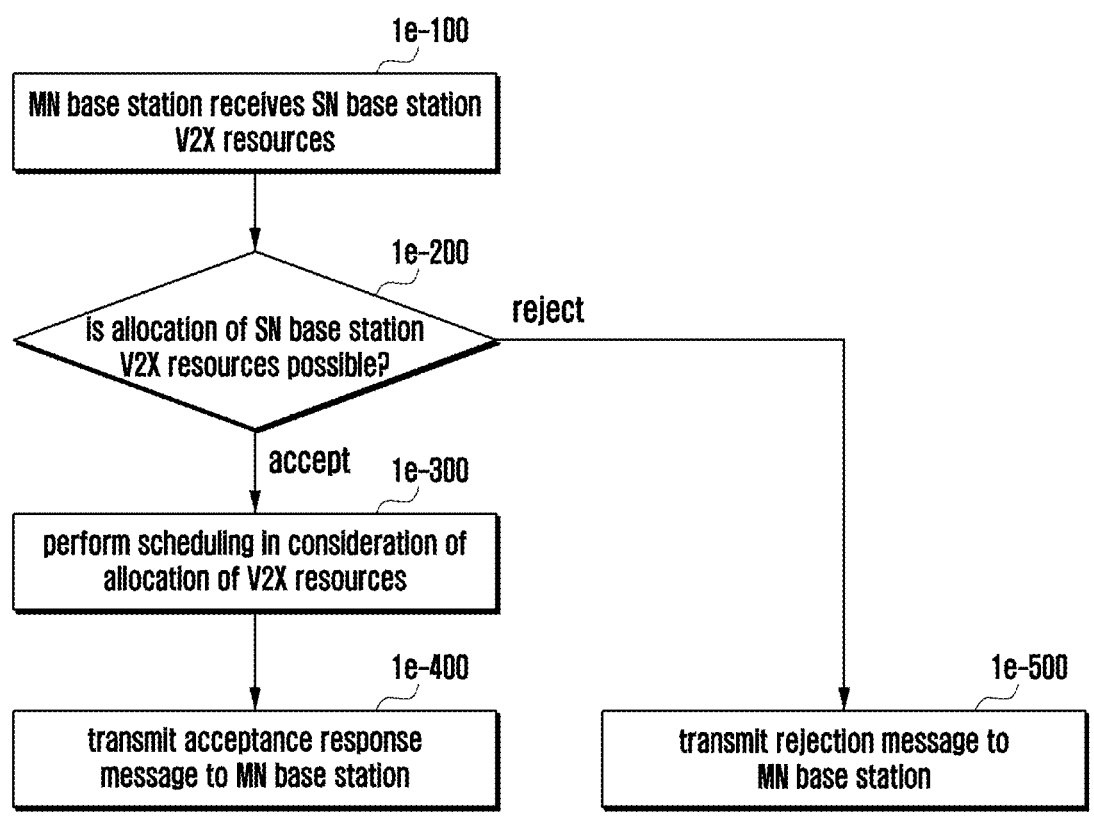
FIG. 1E illustrates a flowchart of an operation of the SN base station when the MN base station determines V2X resources to be used by the SN base station, informs the connected SN base station of the V2X resources, and supports the V2X UE to communicate using the V2X resources of the SN base station according to an embodiment of the disclosure.

FIG. 1E illustrates a flowchart of an operation of the SN base station when the MN base station determines V2X resources to be used by the SN base station, informs the connected SN base station of the V2X resources, and supports the V2X UE to communicate using the V2X resources of the SN base station according to an embodiment of the disclosure.

Referring to FIG. 1E, the SN base station receives SN base station V2X resource information from the MN base station in step 1e-100, and determines whether there is no problem in allocating and using SN base station V2X resources in step 1e-200. If the SN base station determines to accept V2X resource allocation in step 1e-200, the SN base station configures scheduling in consideration of the corresponding V2X resources when performing scheduling for serving UEs in step 1e-300. In step 1e-400, the SN base station transmits an acceptance response message to the MN base station. If it is determined to reject the V2X resource use configuration transmitted by the MN base station in step 1e-200, the SN base station transmits a rejection message to the MN base station in step 1e-500.

Figure 1F:
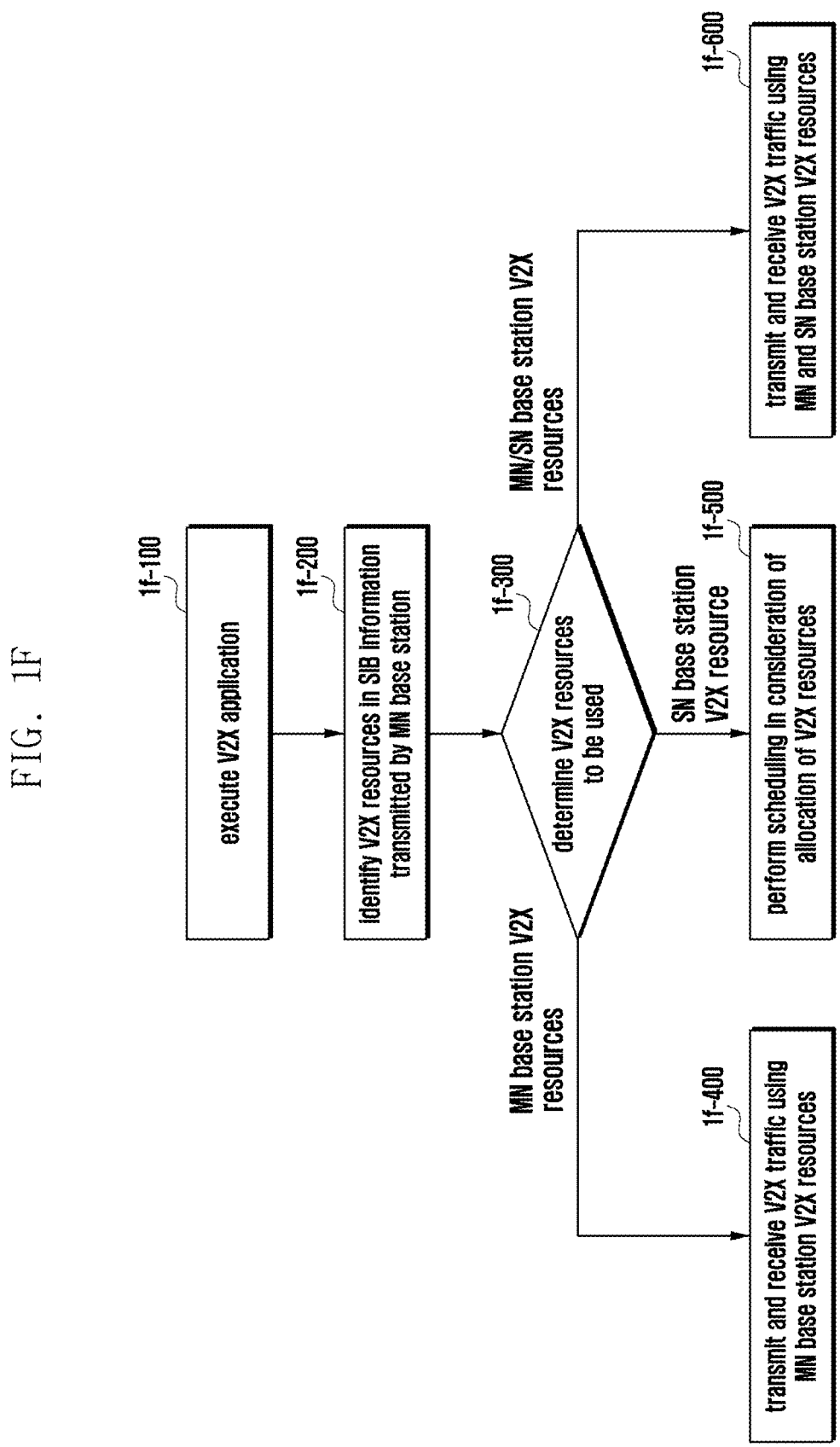
FIG. 1F illustrates a flowchart of an operation of the V2X UE when the MN base station determines V2X resources to be used by the SN base station, informs the connected SN base station of the V2X resources, and supports the V2X UE to communicate using the V2X resources of the SN base station according to an embodiment of the disclosure.

FIG. 1F illustrates a flowchart of an operation of the V2X UE when the MN base station determines V2X resources to be used by the SN base station, informs the connected SN base station of the V2X resources, and supports the V2X UE to communicate using the V2X resources of the SN base station according to an embodiment of the disclosure.

Referring to FIG. 1F, if the V2X UE executes a V2X application in step 1f-100, the V2X UE receives SIB information transmitted by the MN base station and identifies V2X resource information in step 1f-200. The V2X UE determines V2X resources to be used for V2X traffic transmission in step 1f-300 on the basis of at least one of a V2X application, an amount of required traffic, MN base station V2X resources, SN base station V2V resources, and another configuration policy. Further, the V2X UE may make a request for allocating desired V2X resources to the MN through dedicated signaling and receive allocation of MN or SN V2X resources from the MN through dedicated signaling. If the V2X UE determines to use the MN base station V2X resources in step 1f-300, the V2X UE transmits V2X traffic using the MN base station V2X resources in step 1f-400. If the V2X UE determines to use the SN base station V2X resources in step 1f-300, the V2X UE transmits V2X traffic using the SN base station V2X resources in step 1f-500. If the V2X UE determines to use the MN base station and SN base station V2X resources in step 1f-300, the V2X UE transmits V2X traffic using the MN base station and SN base station V2X resources in step 1f-600.

Figure 1G:
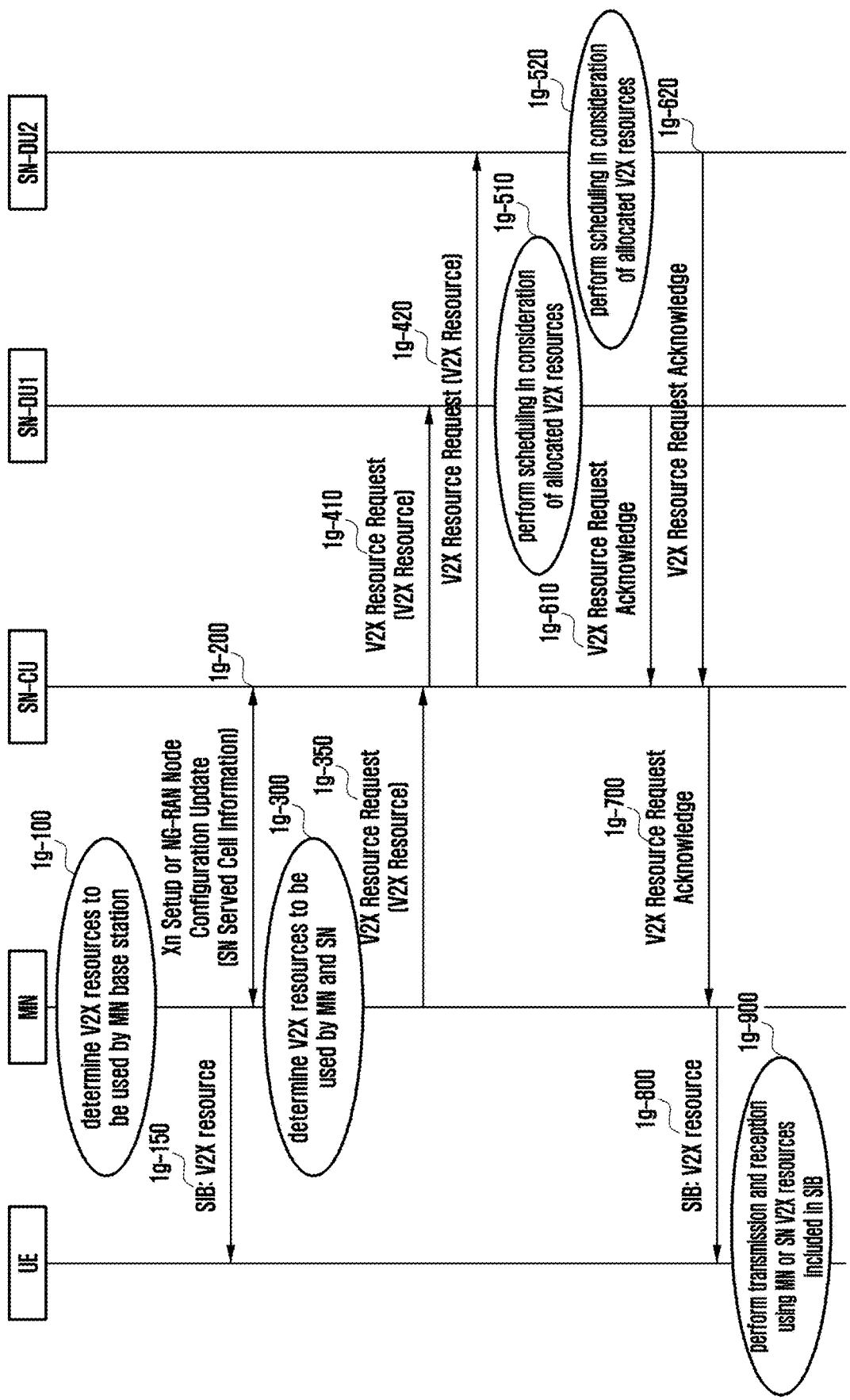
FIG. 1G illustrates a procedure in which, when the SN base station operates in a CU-DU functional split structure according to an embodiment of the disclosure, the MN base station determines V2X resources to be used by the SN base station, informs the connected SN base station of the V2X resources, and supports the V2X UE to communicate using the V2X resources of the SN base station.

FIG. 1G illustrates an example of a procedure in which, when the SN base station operates in a CU-DU functional split structure according to an embodiment of the disclosure, the MN base station determines V2X resources to be used by the SN base station and informs the connected SN base station of the V2X resources, and the V2X UE communicates using the V2X resources of the SN base station.

Referring to FIG. 1G, in step 1g-100, the MN base station determines V2X resources to be used by the MN base station according to a V2X resource allocation policy of the MN base station configured in the MN base station through operation and management (OAM) or other methods. In step 1g-150, the MN base station broadcasts a system information block (SIB) message including MN base station V2X resource information. Further, the MN base station may schedule a V2X transmission request made by the UE through V2X resources to be used by the MN base station. In step 1g-200, the SN base station transfers information on cells served by the SN base station to the MN base station during a procedure for connecting to the MN base station or a process of updating an SN base station parameter. In step 1g-300, the MN base station determines V2X resources to be used by the SN base station according to a V2X resource allocation policy of the SN base station configured in the MN base station on the basis of cell information provided by the SN base station and through OAM or other methods In step 1g-350, the MN base station transfers the determined V2X resource information of the SN base station to an SN-central unit (CU), and at this time transfers the determined V2X resources to a plurality of SN-CUs related to the determined V2X resources. A message transmitted in step 1g-350 may be transmitted using non-UE associated signaling or UE associated signaling. The SN-CU receiving the V2X resource information to be used by the SN base station from the MN base station transfers the V2X resource information to be used by the SN to SN-distributed Units (DUs) (SN-DU1 and SN-DU2) connected to the SN-CU in step 1g-410 and step 1g-420. Messages transmitted in step 1g-410 and step 1g-420 may be transmitted using non-UE associated signaling or UE associated signaling. The SN-DUs (SN-DU1 and SN-DU2) receiving the SN base station V2X resource information configures scheduling in consideration of the corresponding V2X resources when the SN-DUs perform scheduling for serving UEs in step 1g-510 and step 1g-520. For example, each of SN-DU1 and SN-DU2 may perform scheduling for serving UEs only through resources other than V2X resources. SN-DU1 and SN-DU2 transmit a response message to the SN-CU in response to reception and application of V2X resource information in step 1g-610 and step 1g-620, and the SN-CU transmits a response message to the MN base station in response to reception and application of V2X resource information in step 1g-700. After receiving the response message from the SN base station, the MN base station broadcasts a system information block (SIB) message including updated V2X resource information in step 1g-800. Further, the MN base station may schedule a V2X transmission request made by the UE through V2X resources of the SN base station. After the V2X UE identifies the V2X resource information included in the SIB, if V2X traffic transmission/reception is needed, the V2X UE transmits V2X traffic using the V2X resources of the SN base station as necessary in step 1g-900. In the embodiment illustrated in FIG. 1G, when V2X resource information or response information is transmitted between the MN base station and the SN-CU, between the SN-CU and SN-DU1, and between the SN-CU and SN-DU2, a dedicated message for transmitting information related to the V2X resources may be used, or information related to the V2X resource information may be inserted into an already defined message for another purpose and transmitted.

Figure 1H:
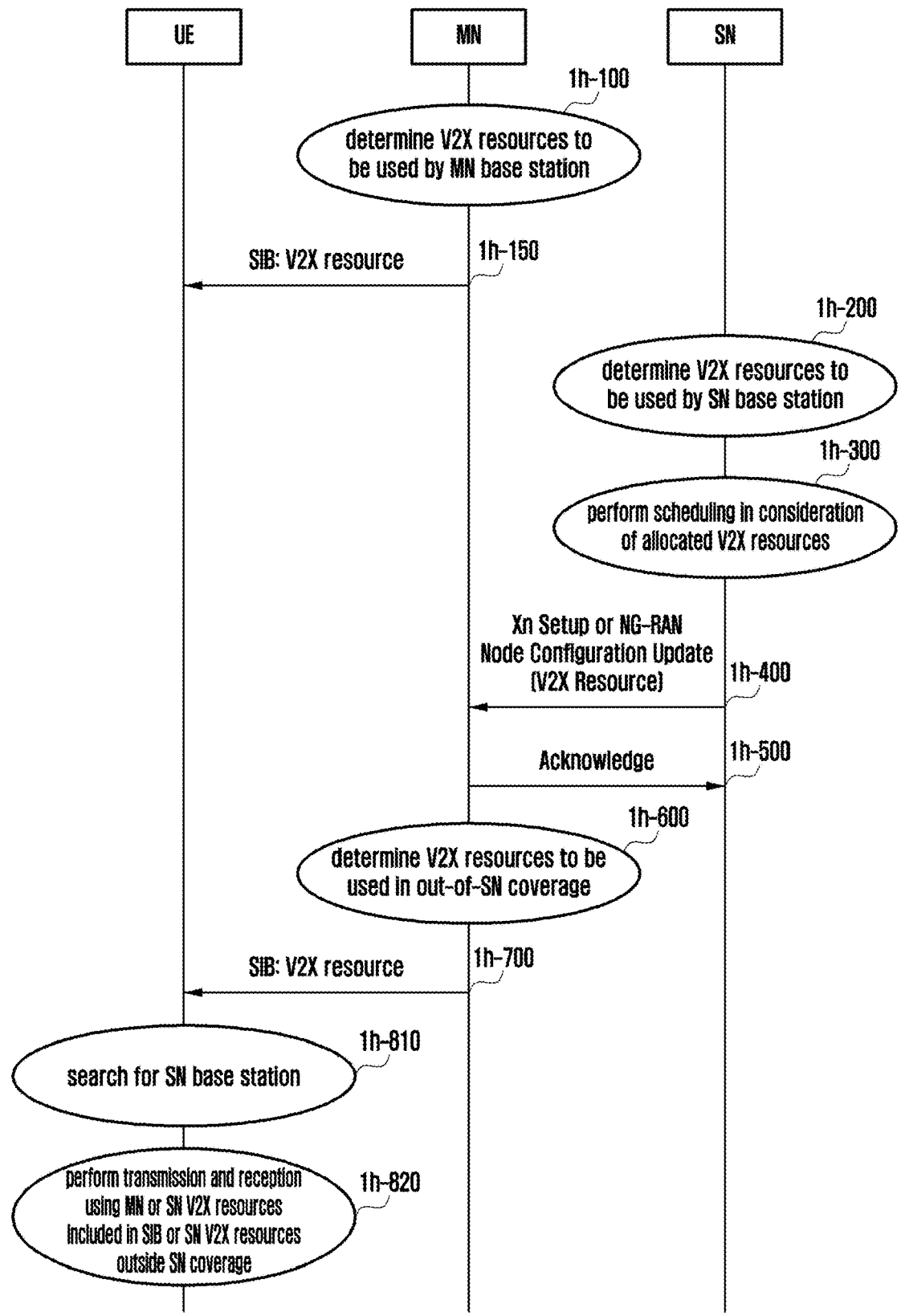
FIG. 1H illustrates a procedure in which the SN base station determines V2X resources to be used by the SN base station, informs the connected MN base station of the determined V2X resources, and supports the V2X UE to communicate using the V2X resources of the SN base station according to an embodiment of the disclosure.

FIG. 1H illustrates an example of a procedure in which the SN base station determines V2X resources to be used by the SN base station and informs the connected MN base station of the V2X resources, and the V2X UE communicates using the V2X resources of the SN base station according to an embodiment of the disclosure.

Referring to FIG. 1H, in step 1h-100, the MN base station determines V2X resources to be used by the MN base station according to a V2X resource allocation policy of the MN base station configured in the MN base station through OAM or other methods. In step 1h-150, the MN base station broadcasts a system information block (SIB) message including MN base station V2X resource information. Further, the MN base station may schedule a V2X transmission request made by the UE through V2X resources to be used by the MN base station. In step 1h-200, the SN base station determines V2X resources to be used by the SN base station according to a V2X resource allocation policy of the SN base station configured in the SN base station through OAM or other methods. The SN base station configures scheduling in consideration of the corresponding V2X resources when the SN base station performs scheduling for serving UEs in step 1h-300. For example, the SN base station performs scheduling for serving UEs only through resources other than the V2X resources. In step 1*h*-400, the SN base station transfers the determined V2X resource information of the SN base station to the MN base station, and at this time, a plurality of SN base stations transfers the determined SN base station V2X resources to the MN base station. A message transmitted in step 1*h*-400 may be transmitted using non-UE associated signaling or UE associated signaling. The MN base station receiving the V2X resource information to be used by the SN base station from the SN base station determines V2X resources in frequency resources allocated to the SN base station, which are used outside the coverage of the SN base station, in step 1*h*-600. At this time, the MN base station may not allocate resources so that the V2X UE does not use SN base station V2X resources outside the SN coverage. In step 1*h*-700, the MN base station broadcast a system information block (SIB) message including at least one of MN base station V2X resources, SN base station V2X resources, and V2X resource information to be used outside the SN coverage. Further, the MN base station may schedule a V2X transmission request made by the UE through V2X resources of the SN base station. After identifying V2X resources included in the SIB, if V2X traffic transmission and reception are needed, the V2X UE first searches for or measures the SN base station in the case of need in step 1*h*-800, and transmits V2X traffic using V2X resources of the MN base station, V2X resources of the SN base station, and SN V2X resources outside the SN base station coverage as necessary in step 1*h*-820. When V2X resource information or response information is transmitted between the MN base station and the SN base station, a dedicated message for transmitting information related to the V2X resource information may be used, or information related to the V2X resource information may be inserted into a message already defined for another purpose and then transmitted.

Figure 1I:
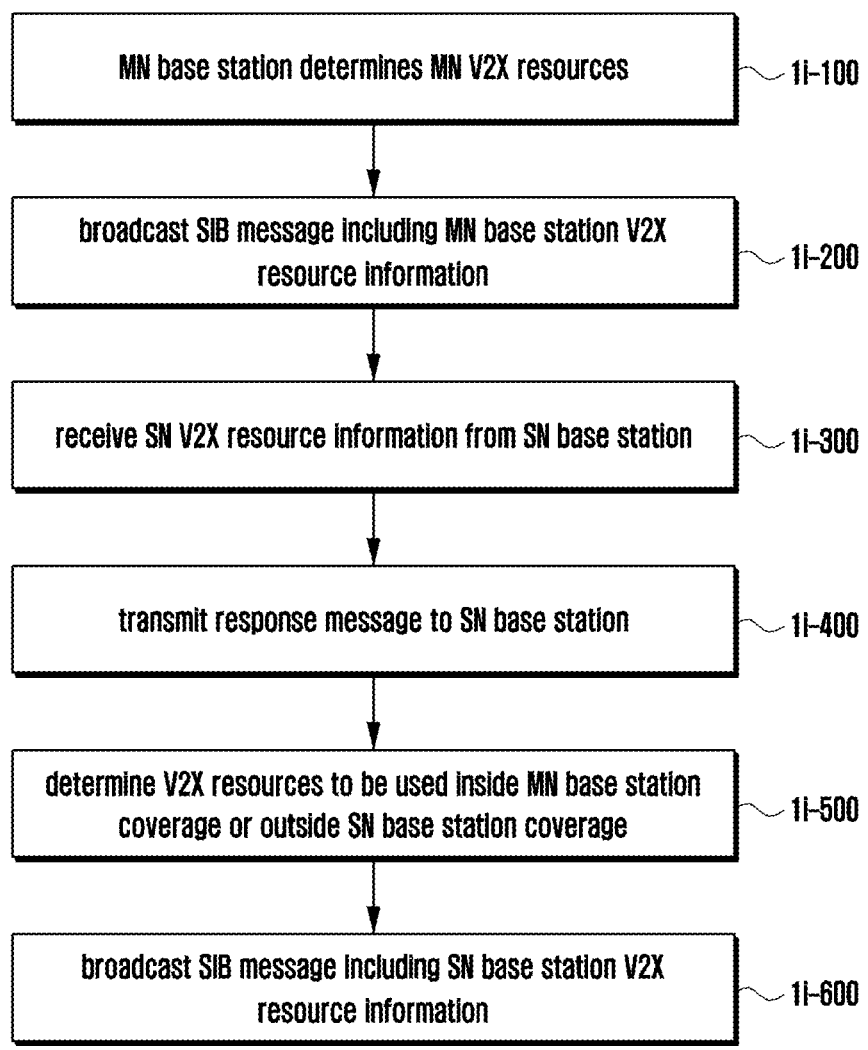
FIG. 1I illustrates a flowchart of an operation of the MN base station when the SN base station determines V2X resources to be used by the SN base station, informs the connected MN base station of the V2X resources, and supports the V2X UE to communicate using the V2X resources of the SN base station according to an embodiment of the disclosure.

FIG. 1I illustrates a flowchart of an operation of the MN base station when the SN base station determines V2X resources to be used by the SN base station, informs the connected MN base station of the V2X resources, and supports the V2X UE to communicate using the V2X resources of the SN base station according to an embodiment of the disclosure.

Referring to FIG. 1I, the MN base station determines V2X resources to be used by the MN base station in step 1*i*-100, and broadcasts an SIB message including MN base station V2X resource information in step 1*i*-200. The MN base station receives SN base station V2X resource information from the SN base station in step 1*i*-300, and transmits a response message to the SN base station in step 1*i*-400. The MN base station determines V2X resources in frequency resources allocated to the SN base station, which are used inside the MN base station coverage or outside the SN base station coverage in step 1*i*-500. In step 1*i*-600, the MN base station broadcast a system information block (SIB) message including at least one of MN base station V2X resources, SN base station V2X resources, and V2X resource information to be used outside the SN coverage. Further, the MN base station may schedule a V2X transmission request made by the UE through V2X resources of the SN base station.

Figure 1J:
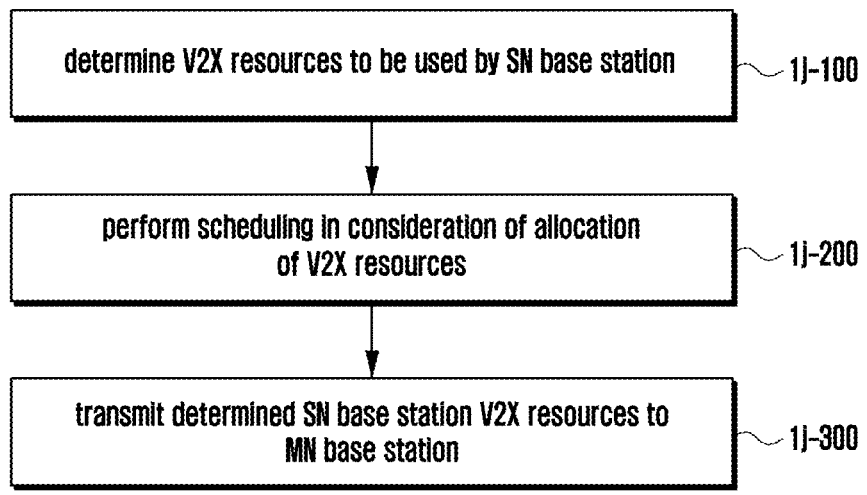
FIG. 1J illustrates a flowchart of an operation of the SN base station when the SN base station determines V2X resources to be used by the SN base station, informs the connected MN base station of the V2X resources, and supports the V2X UE to communicate using the V2X resources of the SN base station according to an embodiment of the disclosure.

FIG. 1J illustrates a flowchart of an operation of the SN base station when the SN base station determines V2X resources to be used by the SN base station, informs the connected MN base station of the V2X resources, and supports the V2X UE to communicate using the V2X resources of the SN base station according to an embodiment of the disclosure.

Referring to FIG. 1J, the SN base station determines V2X resources to be used by the SN base station in step 1*j*-100. The SN base station configures scheduling in consideration of the corresponding V2X resources when the SN base station performs scheduling for serving UEs in step 1*j*-200. The SN base station transmits SN base station V2X resource information to the MN base station and receives a response message in step 1*j*-300.

Figure 1K:
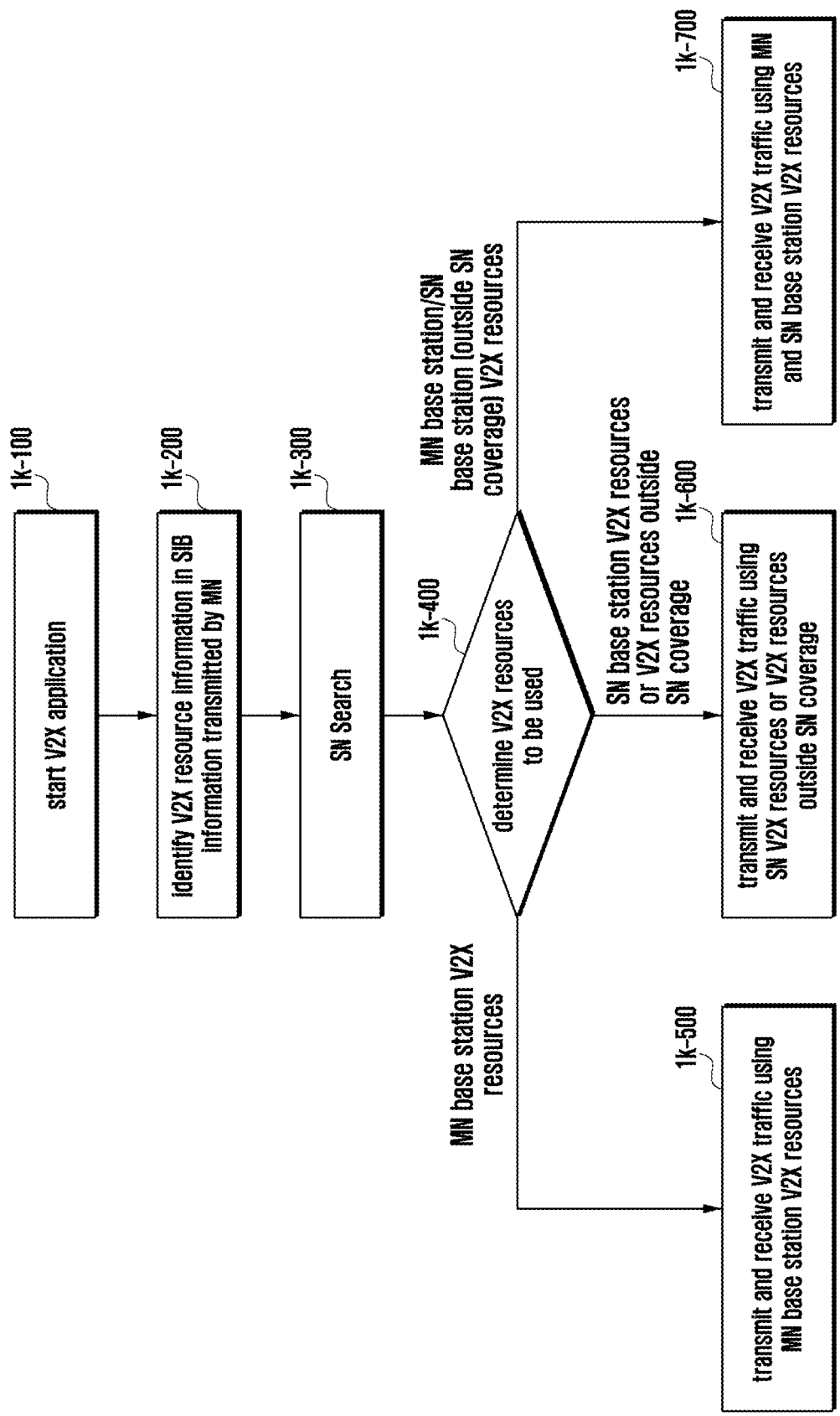
FIG. 1K illustrates a flowchart of an operation of the V2X UE when the SN base station determines V2X resources to be used by the SN base station, informs the connected NN base station of the V2X resources, and supports the V2X UE to communicate using the V2X resources of the SN base station according to an embodiment of the disclosure.

FIG. 1K illustrates a flowchart of an operation of the V2X UE when the SN base station determines V2X resources to be used by the SN base station, informs the connected MN base station of the V2X resources, and supports the V2X UE to communicate using the V2X resources of the SN base station according to an embodiment of the disclosure.

Referring to FIG. 1K, if the V2X UE executes a V2X application in step 1*k*-100, the V2X UE receives SIB information transmitted by the MN base station and identifies V2X resource information in step 1*k*-200. Further, the V2X UE may make a request for allocating desired V2X resources to the MN through dedicated signaling and receive allocation of MN or SN V2X resources from the MN through dedicated signaling. In step 1*k*-300, the V2X UE searches for or measure the SN base station in the case of need. The V2X UE determines V2X resources to be used for V2X traffic transmission in step 1*k*-400 on the basis of at least one of the SN base station search/measurement result, a V2X application, an amount of required traffic, MN base station V2X resources, SN base station V2V resources, and another configuration policy. If the V2X UE determines to use the MN base station V2X resources in step 1*k*-400, the V2X UE transmits V2X traffic using the MN base station V2X resources in step 1*k*-500. If the V2X UE determines to use the SN base station V2X resources or the SN V2X resources outside the SN coverage in step 1*k*-400, the V2X UE transmits V2X traffic using the SN base station V2X resources or the V2X resources outside the SN coverage in step 1*k*-600. If the V2X UE determines to use the MN base station and SN base station V2X resources or the SN V2X resources outside the SN coverage in step 1*k*-400, the V2X UE transmits V2X traffic using the MN base station and SN base station V2X resources or the SN V2X resources outside the SN coverage in step 1*k*-700.

Figure 1L:
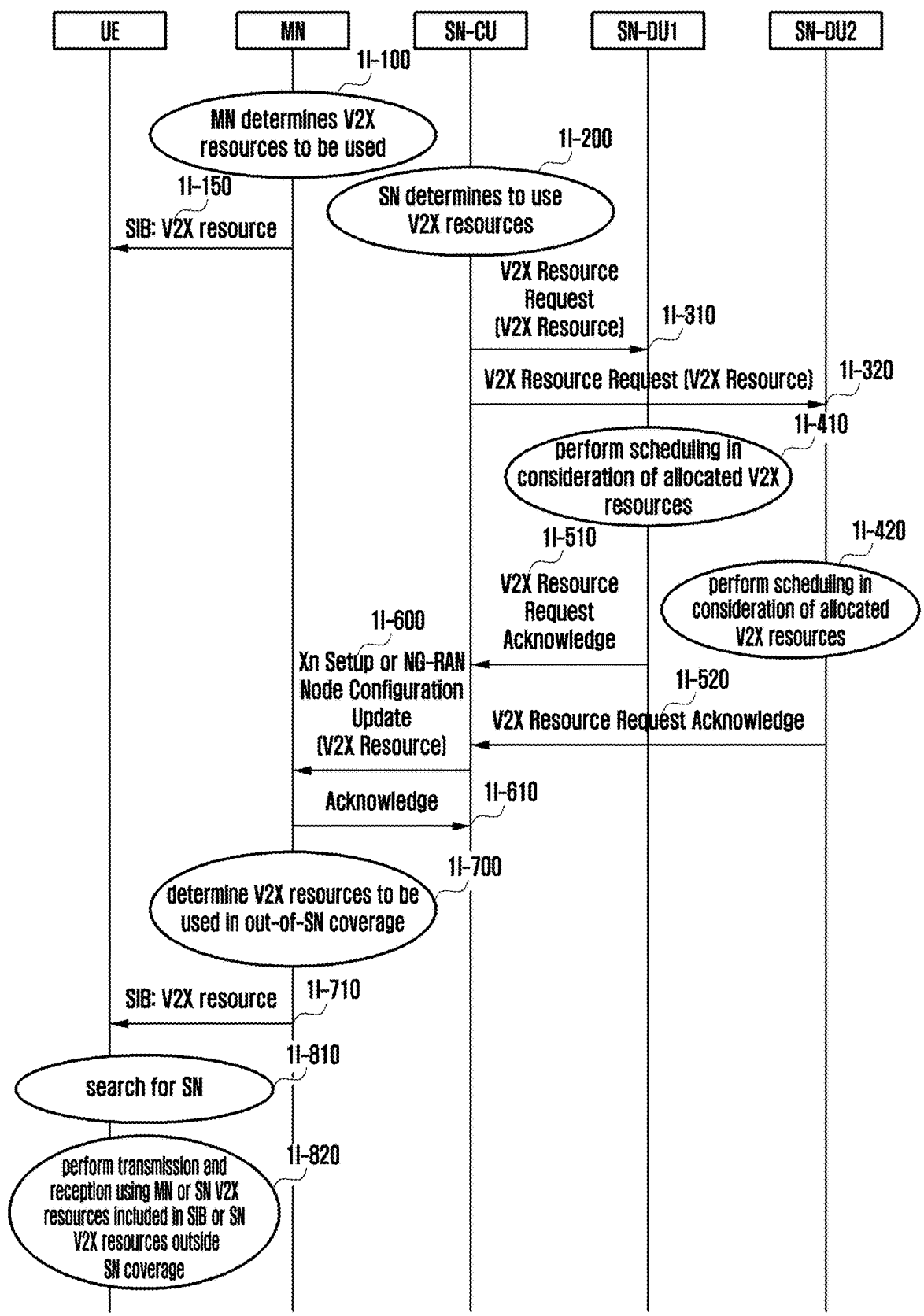
FIG. 1L illustrates a procedure in which, when the SN base station operates in a CU-DU functional split structure according to an embodiment of the disclosure, the SN-CU determines V2X resources to be used by the connected SN-DU, informs the connected MN base station of the V2X resources, and supports the V2X UE to communicate using the V2X resources of the SN base station according to an embodiment of the disclosure.

FIG. 1L illustrates an example of a procedure in which, when the SN base station operates in a CU-DU functional split, the SN-CU of the SN base station determines V2X resources to be used by the SU-DU connected to the SN-CU and informs the connected SN-DU of the V2X resources, and the V2X UE communicates using the V2X resources of the SN-DU according to an embodiment of the disclosure.

Referring to FIG. 1L, in step 1*l*-100, the MN base station determines V2X resources to be used by the MN base station according to a V2X resource allocation policy of the MN base station configured in the MN base station through OAM or other methods. In step 1*l*-150, the MN base station broadcasts a system information block (SIB) message including MN base station V2X resource information. Further, the MN base station may schedule a V2X transmission request made by the UE through V2X resources to be used by the MN base station. In step 1*l*-200, the SN-CU of the SN base station determines V2X resources to be used by the SN base station according to a V2X resource allocation policy of the SN base station configured in the SN base station through OAM or other methods. The SN-CU transfers the determined V2X resource information to each of the SN-DUs (that is, SN-DU1 and SN-DU2) connected to the SN-CU in step 1*l*-310 and step 1*l*-320. Messages transmitted in step 1*l*-310 and step 1*l*-320 may be transmitted using non-UE associated signaling or UE associated signaling. SN-DU1 and SN-DU2 configure scheduling in consideration of the corresponding V2X resources when performing scheduling for serving UEs in step 1*l*-410 and step 1*l*-510. For example, each of SN-DU1 and SN-DU2 may perform scheduling for serving UEs only through resources other than V2X resources. SN-DU1 and SN-DU2 transmit a response message to the SN-CU in step 1*l*-510 and step 1*l*-520. In step 1*l*-600, the SN-CU transfers the determined V2X resource information of the SN base station to the MN base station, and at this time, a plurality of SN base stations may transfer the determined SN base station V2X resources to the MN base station. A message transmitted in step 1*l*-600 may be transmitted using non-UE associated signaling or UE associated signaling. The MN base station transmits a response message to the SN-CU in step 1*l*-610, and determines V2X resources in frequency resources allocated to the SN base station that are used outside the SN base station coverage in step 1*l*-700. At this time, the MN base station may not allocate resources so that the V2X UE does not use SN base station V2X resources outside the SN coverage. In step 1*l*-710, the MN base station broadcast a system information block (SIB) message including at least one of MN base station V2X resources, SN base station V2X resources, and V2X resource information to be used outside the SN coverage. Further, the MN base station may schedule a V2X transmission request made by the UE through V2X resources of the SN base station. After identifying V2X resources included in the SIB, if V2X traffic transmission and reception are needed, the V2X UE first searches for or measures the SN base station in the case of need in step 1*l*-810, and transmits V2X traffic using at least one of V2X resources of the MN base station, V2X resources of the SN base station, and SN V2X resources outside the SN base station coverage as necessary in step 1*l*-820. When V2X resource information or response information is transmitted between the MN base station and the SN-CU, between the SN-CU and SN-DU1, and between the SN-CU and SN-DU2, a dedicated message for transmitting information related to the V2X resources may be used, or information related to the V2X resource information may be inserted into an already defined message for another purpose and transmitted.

Figure 1M:
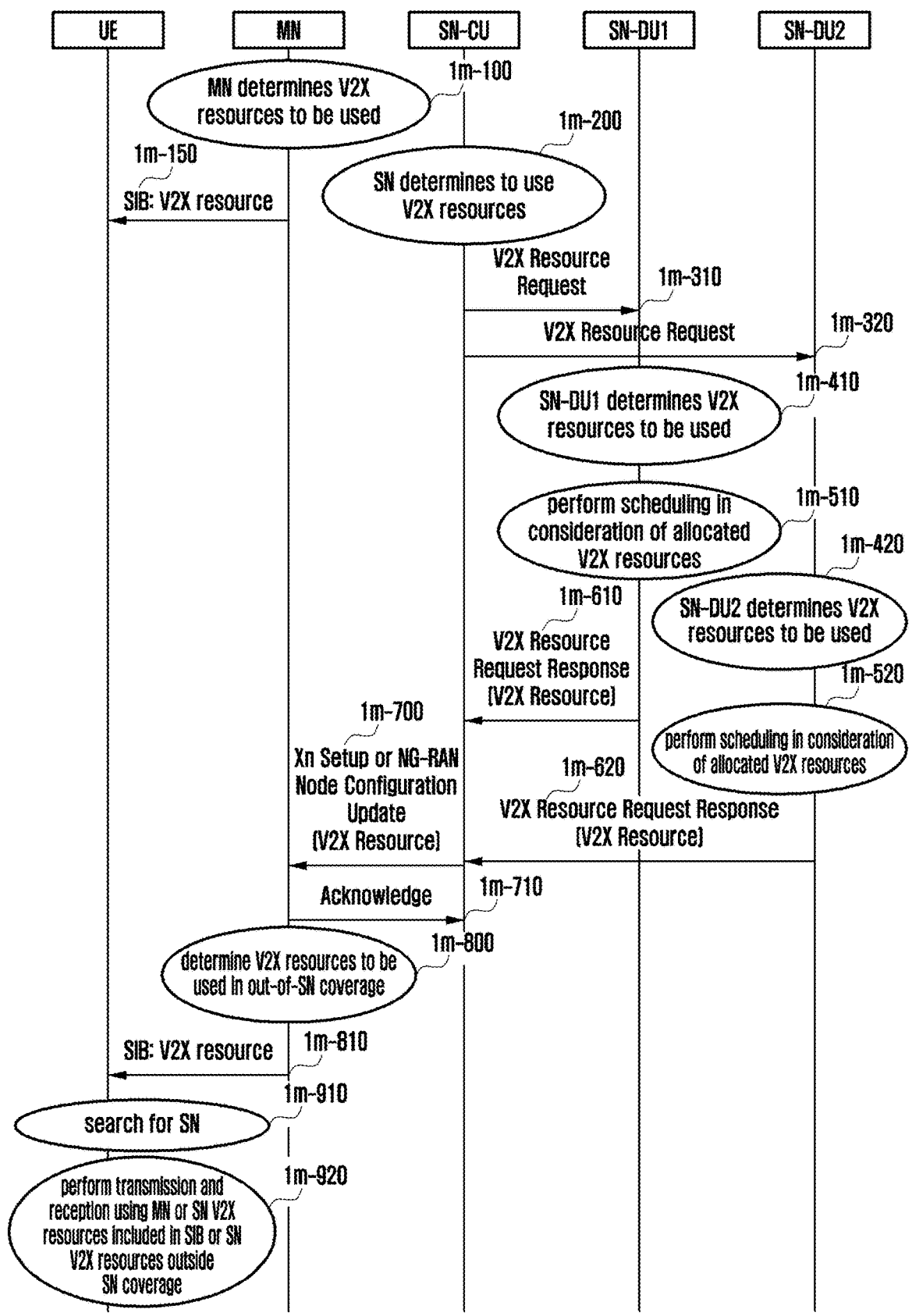
FIG. 1M illustrates the case in which the SN base station operates in a CU-DU functional split according to an embodiment of the disclosure, and specifically a procedure in which the SN-DU determines V2X resources to be used by the SN-DU according to a request from the SN-CU and informs the connected SN-CU of the determined V2X resources, and the SN-CU informs the MN base station of the determined V2X resources and supports the V2X UE to communicate using the V2X resources of the SN base station.

FIG. 1M illustrates the case in which the SN base station operates in a CU-DU functional split structure according to an embodiment of the disclosure. Specifically, FIG. 1M illustrates an example of a procedure in which the SN-CU of the SN base station determines to use some of SN resources as V2X resources and makes a request for allocating V2X resources to the SU-DU connected to the SN-CU, and the SN-DU determines V2X resources and informs the SN-CU of the determined V2X resources, and then the SN-CU informs the MN base station of V2X resources of the SN base station again, so that the V2X UE communicates using the V2X resources of the SN-DU.

Referring to FIG. 1M, in step 1*m*-100, the MN base station determines V2X resources to be used by the MN base station according to a V2X resource allocation policy of the MN base station configured in the MN base station through OAM or other methods. In step 1*m*-150, the MN base station broadcasts a system information block (SIB) message including MN base station V2X resource information. Further, the MN base station may schedule a V2X transmission request made by the UE through V2X resources to be used by the MN base station. In step 1*m*-200, the SN-CU of the SN base station determines to use some of the SN resources as V2X resources according to OAM or other triggering methods. The SN-CU makes a request for allocating V2X resources to the SN-DUs (SN-DU1 and SN-DU2) connected to the SN-CU in step 1*m*-310 and step 1*m*-320. Messages transmitted in step 1*m*-310 and step 1*m*-320 may be transmitted using non-UE associated signaling or UE associated signaling. SN-DU1 and SN-DU2 determines V2X resources to be used by the SN-DU according to a V2X resource allocation policy of the SN base station configured in the SN-DU through OAM or other methods in step 1*m*-410 and step 1*m*-420. SN-DU1 and SN-DU2 configure scheduling in consideration of the corresponding V2X resources when performing scheduling for serving UEs in step 1*l*-510 and step 1*l*-520. For example, each of SN-DU1 and SN-DU2 may perform scheduling for serving UEs only through resources other than V2X resources. SN-DU1 and SN-DU2 transmit the determined V2X resource information to the SN-DU connected to the SN-CU in step 1*m*-610 and 1*m*-620. In step 1*m*-700, the SN-CU transfers the determined V2X resource information of the SN base station to the MN base station, and at this time, a plurality of SN base stations may transfer the determined SN base station V2X resources to the MN base station. A message transmitted in step 1*m*-700 may be transmitted using non-UE associated signaling or UE associated signaling. The MN base station transmits a response message to the SN-CU in step 1*m*-710, and determines V2X resources in frequency resources allocated to the SN base station that are used outside the SN base station coverage in step 1*m*-800. At this time, the MN base station may not allocate resources so that the V2X UE does not use SN base station V2X resources outside the SN coverage. In step 1*m*-810, the MN base station broadcast a system information block (SIB) message including at least one of MN base station V2X resources, SN base station V2X resources, and V2X resource information to be used outside the SN coverage. Further, the MN base station may schedule a V2X transmission request made by the UE through V2X resources of the SN base station. After identifying V2X resources included in the SIB, if V2X traffic transmission and reception are needed, the V2X UE first searches for or measures the SN base station in the case of need in step 1*m*-910, and transmits V2X traffic using at least one of V2X resources of the MN base station, V2X resources of the SN base station, and SN V2X resources outside the SN base station coverage as necessary in step 1*l*-920. When V2X resource information or response information is transmitted between the MN base station and the SN-CU, between the SN-CU and SN-DU1, and between the SN-CU and SN-DU2, a dedicated message for transmitting information related to the V2X resources may be used, or information related to the V2X resource information may be inserted into an already defined message for another purpose and transmitted.

Figure 1N:
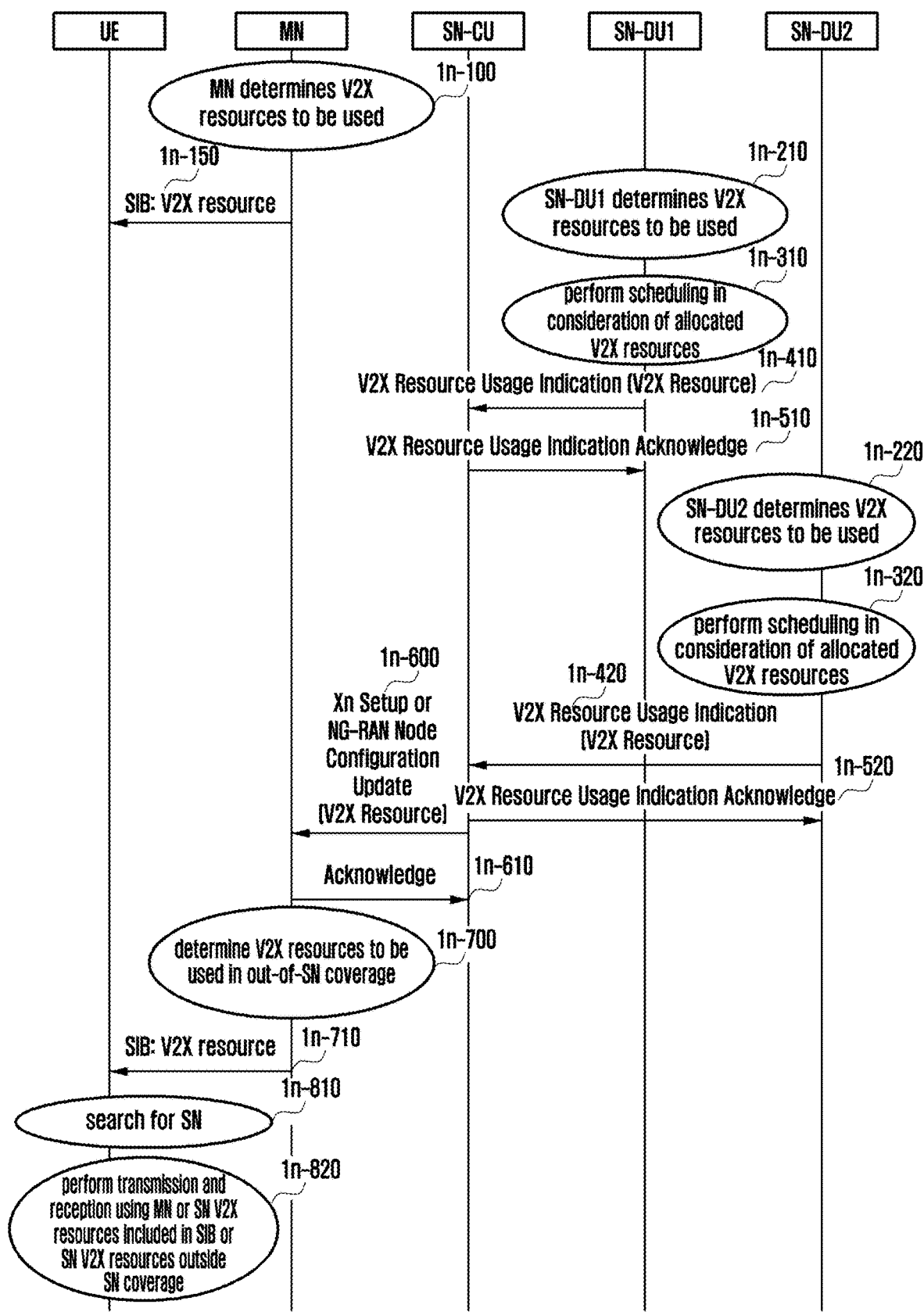
FIG. 1N illustrates the case in which the SN base station operates in a CU-DU functional split according to an embodiment of the disclosure, and specifically a procedure in which the SN-DU determines V2X resources to be used by the SN-DU and informs the connected SN-CU of the determined V2X resources, and the SN-CU informs the MN base station of the determined V2X resources and supports the V2X UE to communicate using the V2X resources of the SN base station.

FIG. 1N illustrates the case in which the SN base station operates in a CU-DU functional split structure according to an embodiment of the disclosure. Specifically, FIG. 1N illustrates an example of a procedure in which the SU-DU of the SN base station determines V2X resources and informs the SN-CU of the determined V2X resources, and the SN-CU informs the MN base station of V2X resources of the SN base station, and thus the V2X UE communicates using the V2X resources of the SN-DU.

Referring to FIG. 1N, in step 1*n*-100, the MN base station determines V2X resources to be used by the MN base station according to a V2X resource allocation policy of the MN base station configured in the MN base station through OAM or other methods. In step 1*n*-150, the MN base station broadcasts a system information block (SIB) message including MN base station V2X resource information. Further, the MN base station may schedule a V2X transmission request made by the UE through V2X resources to be used by the MN base station. SN-DU1 and SN-DU2 determine V2X resources to be used by SN-DU1 and SN-DU2 according to a V2X resource allocation policy of the SN base station configured in the SN-DU through OAM or other methods in step 1*n*-210 and step 1*n*-220. SN-DU1 and SN-DU2 configure scheduling in consideration of the corresponding V2X resources when performing scheduling for serving UEs in step 1*n*-310 and step 1*n*-320. For example, each of SN-DU1 and SN-DU2 may perform scheduling for serving UEs only through resources other than V2X resources. SN-DU1 and SN-DU2 transmit the determined V2X resource information to the SN-DU connected to the SN-CU in step 1*n*-410 and 1*n*-420. Messages transmitted in step 1*n*-410 and step 1*n*-420 may be transmitted using non-UE associated signaling or UE associated signaling. The SN-CU transmits a response message to SN-DU1 and SN-DU2 in step 1*n*-510 and step 1*n*-520. In step 1*n*-600, the SN-CU transfers the determined V2X resource information of the SN base station to the MN base station, and at this time, a plurality of SN base stations may transfer the determined SN base station V2X resources to the MN base station. A message transmitted in step 1*n*-600 may be transmitted using non-UE associated signaling or UE associated signaling. The MN base station transmits a response message to the SN-CU in step 1*n*-610, and determines V2X resources in frequency resources allocated to the SN base station that are used outside the SN base station coverage in step 1*n*-700. At this time, the MN base station may not allocate resources so that the V2X UE does not use SN base station V2X resources outside the SN coverage. In step 1*n*-710, the MN base station broadcast a system information block (SIB) message including at least one of MN base station V2X resources, SN base station V2X resources, and V2X resource information to be used outside the SN coverage. Further, the MN base station may schedule a V2X transmission request made by the UE through V2X resources of the SN base station. After identifying V2X resources included in the SIB, if V2X traffic transmission and reception are needed, the V2X UE first searches for or measures the SN base station in the case of need in step 1*n*-810, and transmits V2X traffic using at least one of V2X resources of the MN base station, V2X resources of the SN base station, and SN V2X resources outside the SN base station coverage as necessary in step 1*n*-820. When V2X resource information or response information is transmitted between the MN base station and the SN-CU, between the SN-CU and SN-DU1, and between the SN-CU and SN-DU2, a dedicated message for transmitting information related to the V2X resources may be used, or information related to the V2X resource information may be inserted into an already defined message for another purpose and transmitted.

FIG. 10A illustrates an example of V2X resource information transmitted between the MN base station and the SN base station or between the SN-CU and the SN-DU according to an embodiment of the disclosure, and FIG. 10B illustrates an example of V2X resource information transmitted between the MN base station and the SN base station or between the SN-CU and the SN-DU according to an embodiment of the disclosure.

FIGS. 10A and 10B illustrate system information block (SIB) formats 1*o*-100 and 1*o*-110 which the MN base station transmits to the UE in connection with allocation of V2X resources, and V2X resource information required for making SIB (for example, SIB21 or SIB26) information is inserted into a message transmitted between the MN base station and the SN base station or between the SN-CU and the SN-DU and the transmitted.

FIG. 1PA illustrates an example of a V2X resource information element (IE) included in a message used to transmit V2X resource information transmitted between the MN base station and the SN base station or between the SN-CU and the SN-DU according to an embodiment of the disclosure, and FIG. 1PB illustrates an example of a V2X resource information element (IE) included in a message used to transmit V2X resource information transmitted between the MN base station and the SN base station or between the SN-CU and the SN-DU according to an embodiment of the disclosure.

Referring to FIGS. 1PA and 1PB, a message for transmitting V2X resources may be configured in the form of adding an IE to the conventional message used by an interface between the MN BB and the SN base station or between the SN-CU and the SN-DU, and may be inserted into a dedicated message for transmitting V2X resource information and then transmitted. FIG. 1PA illustrates an IE configuration example 1*p*-110 for transmitting V2X resource information when V2X resources are allocated in units of SNs or SN-DUs, and FIG. 1PB illustrates an IE configuration example 1*p*-120 for transmitting V2X resource information when V2X resources are allocated in units of cells supported by the SN or the SN-DU. V2X resources may be indicated by a combination including one or more pieces of cell ID information, frequency information, bandwidth information, slot information, physical resource block (PRB) information, and resource element (RB) information.

Figure 1Q:
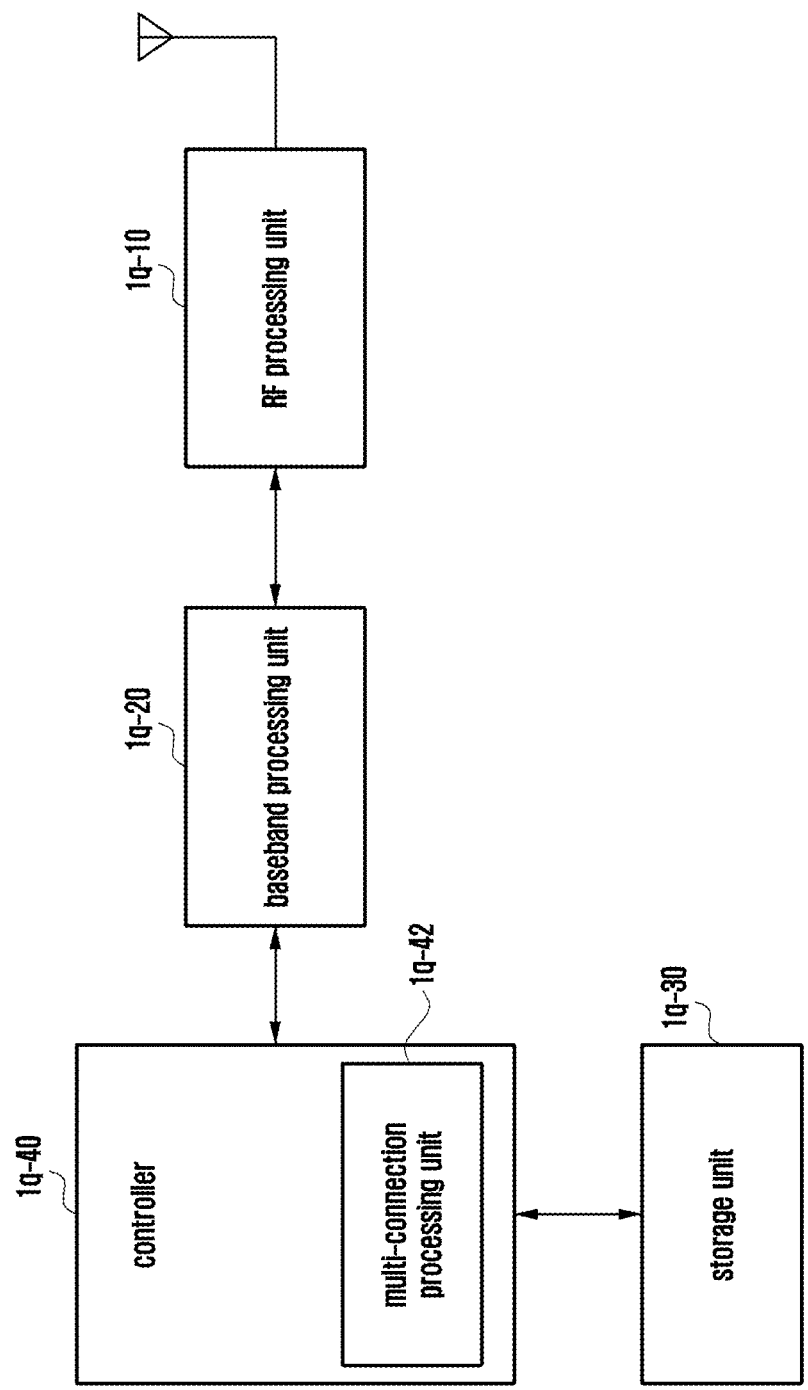
FIG. 1Q illustrates a structure of the UE according to an embodiment of the disclosure.

FIG. 1Q illustrates a structure of a UE according to an embodiment of the disclosure.

Referring to FIG. 1Q, the UE includes a radio-frequency (RF) processing unit 1*q*-10, a baseband processing unit 1*q*-20, a storage unit 1*q*-30, and a controller 1*e*-40.

The RF processing unit 1*q*-10 performs a function for transmitting and receiving a signal through a wireless channel, such as band conversion and amplification of a signal. That is, the RF processing unit 1*q*-10 up-converts a baseband signal provided from the baseband processing unit 1*q*-20 into an RF band signal and then transmits the converted signal through an antenna, and down-converts an RF band signal received through the antenna into a baseband signal. For example, the RF processing unit 1*q*-10 may include a transmission filter, a reception filter, an amplifier, a mixer, an oscillator, a digital-to-analog convertor (DAC), an analog-to-digital convertor (ADC), and the like. Although only one antenna is illustrated in FIG. 1Q, the terminal may include a plurality of antennas. The RF processing unit 1*q*-10 may include a plurality of RF chains. Moreover, the RF processing unit 1*q*-10 may perform beamforming. For the beamforming, the RF processing unit 1*q*-10 may control a phase and a size of each signal transmitted/received through a plurality of antennas or antenna elements.

The baseband processing unit 1*q*-20 performs a function for a conversion between a baseband signal and a bitstream according to a physical layer standard of the system. For example, in data transmission, the baseband processing unit 1*q*-10 generates complex symbols by encoding and modulating a transmission bitstream. Further, in data reception, the baseband processor 1*q*-20 reconstructs a reception bitstream by demodulating and decoding a baseband signal provided from the RF processor 1*q*-10. For example, in an orthogonal frequency division multiplexing (OFDM)

scheme, when data is transmitted, the baseband processing unit 1q-20 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processing unit 1q-20 divides the baseband signal provided from the RF processor 1q-10 in units of OFDM symbols, reconstructs the signals mapped to the subcarriers through a fast Fourier transform (FFT) operation, and then reconstructs a reception bitstream through demodulation and decoding.

The baseband processing unit 1q-20 and the RF processing unit 1q-10 transmit and receive signals as described above. Accordingly, the baseband processing unit 1q-20 or the RF processing unit 1q-10 may be referred to as a transmitter, a receiver, a transceiver, or a communication unit. At least one of the baseband processing unit 1q-20 and the RF processing unit 1q-10 may include a plurality of communication modules to support a plurality of different radio access technologies. Further, at least one of the baseband processing unit 1q-20 and the RF processing unit 1q-10 may include different communication modules to support signals of different frequency bands. For example, the different radio access technologies may include a wireless LAN (for example, IEEE 802.11) and a cellular network (for example, LTE). Further, the different frequency bands may include a super-high frequency (SHF) (for example, 2.5 GHz and 5 Ghz) band and a millimeter (mm) wave (for example, 60 GHz) band.

The storage unit 1q-30 stores data such as a basic program, an application, and setting information for the operation of the UE. Particularly, the storage unit 1q-30 may store information related to a wireless LAN node that performs wireless communication using a wireless LAN access technology. Further, the storage unit 1q-30 provides stored data according to a request from the controller 1q-40.

The controller 1q-40 controls the overall operation of the UE. For example, the controller 1q-40 transmits and receives a signal through the baseband processing unit 1q-20 and the RF processing unit 1q-10. The controller 1q-40 records data in the storage unit 1q-30 and reads the data. To this end, the controller 1q-40 may include at least one processor. For example, the controller 1q-40 may include a communication processor (CP) that performs a control for communication, and an application processor (AP) that controls a higher layer such as an application. According to an embodiment of the disclosure, the controller 1q-40 includes a multi-connection processing unit 1q-42 that performs processing for operation in a multi-connection mode.

The controller 1q-40 according to an embodiment of the disclosure may operate the UE to perform V2X communication on the basis of information configured or generated by at least one of the MN, the SN, the SN-CU, and the SN-DU.

Figure 1R:
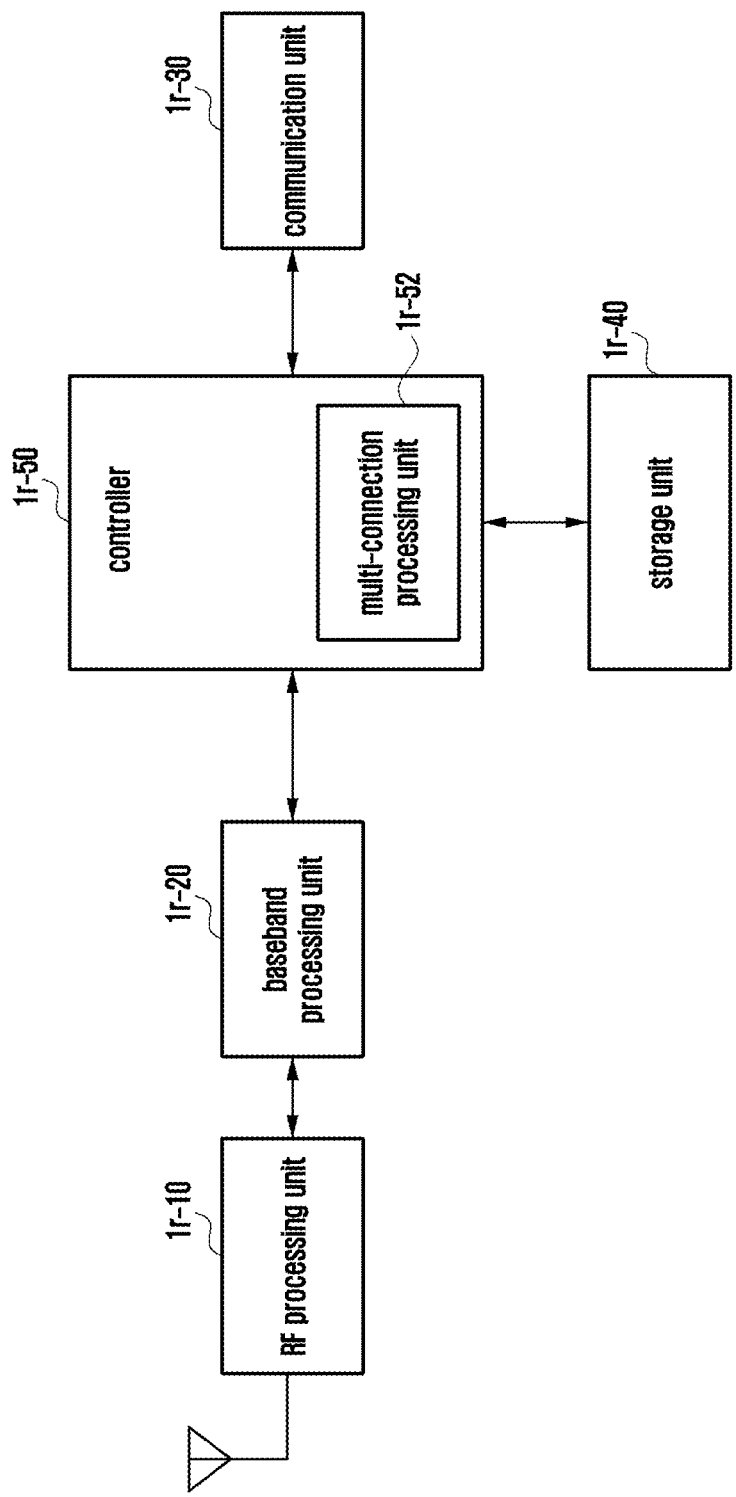
FIG. 1R illustrates a structure of the base station according to an embodiment of the disclosure.

FIG. 1R illustrates a block diagram of a base station in a wireless communication system according to an embodiment of the disclosure.

Referring to FIG. 1R, the base station includes an RF processing unit 1r-10, a baseband processing unit 1r-20, a backhaul communication unit 1r-30, a storage unit 1r-40, and a controller 1r-50.

The RF processing unit 1r-10 performs a function for transmitting and receiving a signal through a wireless channel, such as band conversion and amplification of a signal. That is, the RF processing unit 1r-10 up-converts a baseband signal provided from the baseband processing unit 1r-20 into an RF band signal and then transmits the converted signal through an antenna, and down-converts an RF band signal received through the antenna into a baseband signal. For example, the RF processing unit 1r-10 may include a transmission filter, a reception filter, an amplifier, a mixer, an oscillator, a DAC, and an ADC. Although FIG. 1R illustrates only one antenna, the first access node may include a plurality of antennas. The RF processing unit 1r-10 may include a plurality of RF chains. The RF processing unit 1r-10 may perform beamforming. For the beamforming, the RF processing unit 1r-10 may control a phase and a size of each of the signals transmitted and received through a plurality of antennas or antenna elements. The RF processing unit may perform a downlink MIMO operation by transmitting one or more layers.

The baseband processing unit 1r-20 performs a function of conversion between a baseband signal and a bitstream according to a physical-layer standard of the first radio access technology. For example, in data transmission, the baseband processing unit 1r-20 generates complex symbols by encoding and modulating a transmission bitstream. Further, in data reception, the baseband processor 1r-20 reconstructs a reception bitstream by demodulating and decoding a baseband signal provided from the RF processor 1r-10. For example, in an OFDM scheme, when data is transmitted, the baseband processing unit 1r-20 may generate complex symbols by encoding and modulating the transmission bitstream, map the complex symbols to subcarriers, and then configure OFDM symbols through an IFFT operation and CP insertion. In addition, when data is received, the baseband processing unit 1r-20 divides a baseband signal provided from the RF processing unit 1r-10 in units of OFDM symbols, recovers signals mapped with subcarriers through an FFT operation, and then recovers a reception bitstream through demodulation and decoding. The baseband processing unit 1r-20 and the RF processing unit 1r-10 may transmit and receive signals as described above. Accordingly, the baseband processing unit 1r-20 or the RF processing unit 1r-10 may be referred to as a transmitter, a receiver, a transceiver, a communication unit, or a wireless communication unit.

The backhaul communication unit 1r-30 provides an interface for performing communication with other nodes within the network. That is, the backhaul communication unit 1r-30 converts a bitstream transmitted to another node, for example, the secondary base station or a core network from the master base station, into a physical signal and converts a physical signal received from the other node into the bitstream.

The storage unit 1r-40 stores data such as a basic program, an application, and setting information for the operation of the master base station. Particularly, the storage unit 1r-40 may store information on bearers allocated to the accessed UE and a measurement result reported from the accessed UE. Further, the storage unit 1r-40 may store information which is a reference for providing multiple connections to the UE or stopping the connections. The storage unit 1r-40 provides stored data according a request form the controller 1r-50.

The controller 1r-50 may control the overall operation of the master base station. For example, the controller 1r-50 may transmit and receive a signal through the baseband processing unit 1r-20 and the RF processing unit 1r-10 or through the backhaul communication unit 1r-30. Further, the controller 1r-50 records data in the storage unit 1r-40 and read the data. To this end, the controller 1r-50 may include at least one processor. The controller 1r-50 may further include a multi-connection processing unit 1r-52 that performs processing for operation in a multi-connection mode.

Embodiment 2

Figure 2A:
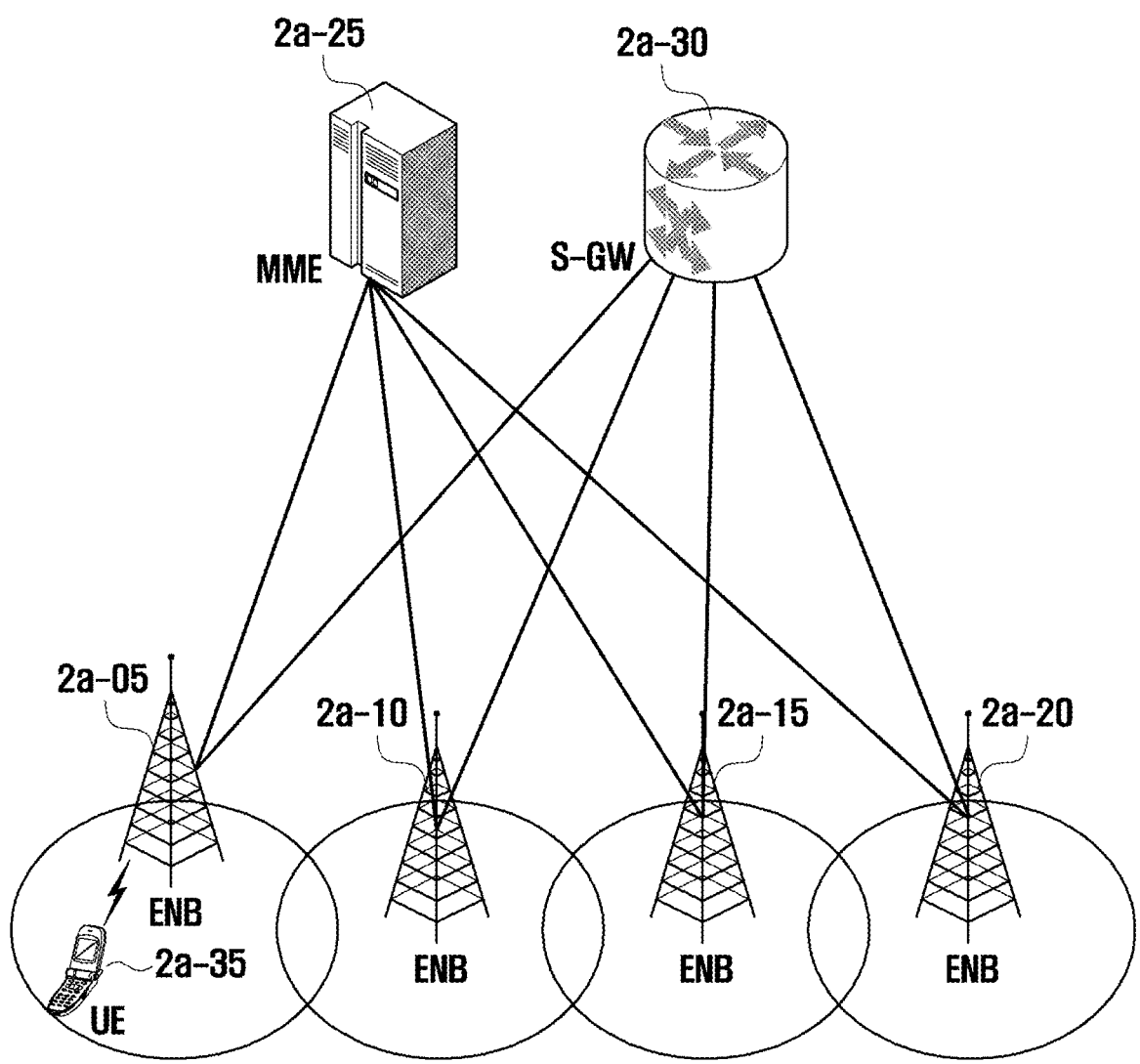
FIG. 2A illustrates a structure of an LTE system according to an embodiment of the disclosure.

FIG. 2A illustrates a structure of an LTE system according to an embodiment of the disclosure. An NR system also has a structure that is practically the same as the LTE system illustrated in FIG. 2A.

Referring to FIG. 2A, the wireless communication system includes a plurality of base stations 2a-05, 2a-10, 2a-15, and 2a-20, a mobility management entity (MME) 2a-20, and a serving gateway (S-GW) 2a-30. A User Equipment (hereinafter, referred to as a UE or a terminal) 2a-35 accesses an external network through the base stations 2a-05, 2a-10, 2a-15, and 2a-20 and the S-GW 2a-30.

The base stations 2a-05, 2a-10, 2a-15, and 2a-20 provide radio access to UEs which access the network as access nodes of the cellular network. That is, in order to serve traffic of users, the base stations 2a-05, 2a-10, 2a-15, and 2a-20 perform scheduling on the basis of collected status information such as buffer statuses, available transmission power statuses, and channel statuses of UEs and support connection between the UEs and a core network (CN). The MME 2a-25 is a device performing a function of managing the mobility of the UE and various control functions and is connected to a plurality of base stations, and the S-GW 2a-30 is a device providing a data bearer. The MME 2a-25 and the S-GW 2a-30 further perform authentication for the UE accessing the network and bearer management, and process packets received from the base stations 2a-05, 2a-10, 2a-15, and 2a-20 or packets to be transferred to the base stations 2a-05, 2a-10, 2a-15, and 2a-20.

Figure 2B:
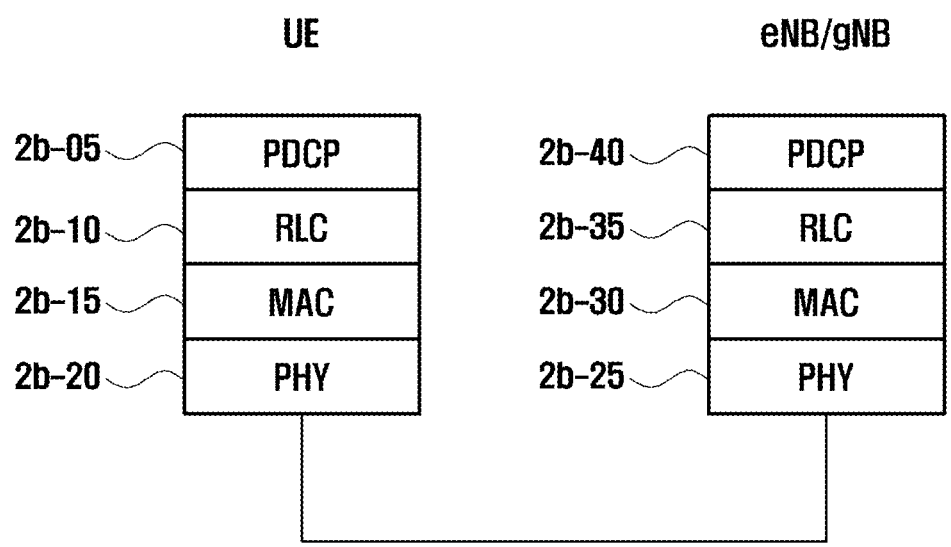
FIG. 2B illustrates wireless protocol structures in LTE and NR systems according to an embodiment of the disclosure.

FIG. 2B illustrates wireless protocol structures in LTE and NR systems according to an embodiment of the disclosure;

Referring to FIG. 2B, the UE and the eNB include packet data convergence protocols (PDCPs) 2b-05 and 2b-40, radio link controls (RLCs) 2b-10 and 2b-35, and medium access controls (MACs) 2b-15 and 2b-30, respectively, in the wireless protocol of the LTE system. The packet data convergence protocols (PDCPs) 2b-05 and 2b-40 perform an operation of compressing/reconstructing an IP header, and the radio link controls (RLCs) 2b-10 and 2b-35 reconfigure a PDCP Packet data unit (PDU) to have a proper size. The MACs 2b-15 and 2b-30 are connected with various RLC layer devices included in one UE, and perform an operation for multiplexing RLC PDUs to the MAC PDU and de-multiplexing the RLC PDUs from the MAC PDU. The PHY layers 2b-20 and 2b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the PHY layer uses hybrid ARQ (HARQ) to correct an additional error, and a receiving side transmits 1-bit information to indicate whether a packet transmitted by a transmitting side is received. The 1-bit information is referred to as HARQ ACK/NACK information. Downlink HARQ ACK/NACK information for uplink data transmission may be transmitted through a physical hybrid-ARQ indicator channel (PHICH) in the case of LTE, and it is determined whether retransmission of the downlink HARQ ACK/NACK information through scheduling information of the corresponding UE is needed in a physical dedicated control channel (PDCCH) that is a channel in which downlink/uplink resource allocation is performed or new transmission should be performed in the case of NR. This is because asynchronous HARQ is applied to NR. Uplink HARQ ACK/HARQ information for downlink transmission may be transmitted through a physical channel such as a physical uplink control channel (PUCCH) or a physical uplink shared channel (PUSCH). In general, the PUCCH is transmitted in uplink of a PCell described below, but, if the terminal supports it, the base station may additionally transmit the PUCCH to the UE in an SCell described below, which is referred to as a PUCCH secondary cell (SCell).

Although not illustrated, there is a radio resource control (RRC) layer above a PDCP layer of each of the UE and the base station, and the RRC layer may transmit and receive an access- and measurement-related configuration control message to control radio resources.

Meanwhile, a PHY layer may include one or a plurality of frequencies/carriers, and a technology for simultaneously configuring and using a plurality of frequencies is referred to as carrier aggregation (CA). CA significantly increases the amount of transmission by the number of secondary carriers by additionally using a primary carrier and one or a plurality of secondary carriers, which is beyond the conventional technology, in which only one carrier is used for communication between the UE (or terminal) and the E-UTRAN NodeB (eNB). Meanwhile, in LTE, a cell within the base station using a primary carrier is referred to as a primary cell (PCell) and a cell within the base station using a subcarrier is referred to as a secondary cell (SCell).

Figure 2C:
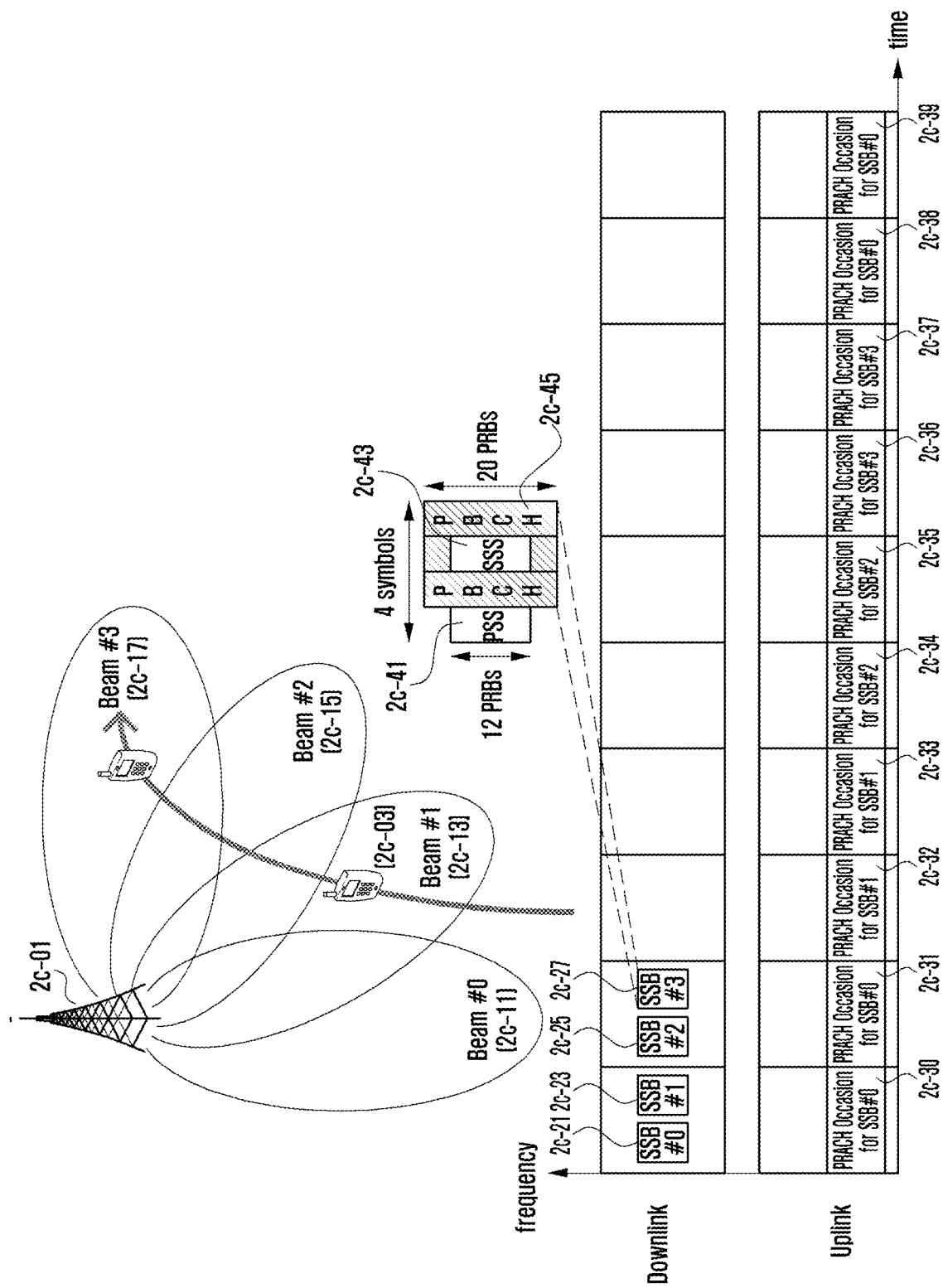
FIG. 2C illustrates downlink and uplink channel frame structures when communication is performed on the basis of beams in an NR system according to some embodiments of the disclosure.

FIG. 2C illustrates downlink and uplink channel frame structures when communication is performed on the basis of beams in an NR system according to an embodiment of the disclosure.

In FIG. 2C, a base station 2c-01 transmits signals in the form of beams in order to transmit the signals in wider coverage or in order to transmit stronger signals as indicated by reference numerals 2c-11, 2c-13, 2c-15, and 2c-17. Accordingly, a UE 2c-03 within the cell should transmit and receive data using a specific beam (beam #1 2c-13 in FIG. 2C) transmitted by the base station 2c-01.

Meanwhile, according to whether the UE 2c-03 is connected to the base station 2c-01, the state of the UE 2c-03 is divided into an idle mode (RRC_IDLE) and a connected mode (RRC_CONNECTED). Accordingly, the base station 2c-01 cannot know the location of the UE 2c-03 in the idle mode.

If the UE 2c-03 in the idle mode desires to transition to the connected mode, the UE 2c-03 receives synchronization signal blocks (SSBs) 2c-21, 2c-23, 2c-25, and 2c-27 transmitted by the base station 2c-01. The SSBs are SSB signals transmitted periodically according to a period configured by the base station 2c-01, and each SSB is divided into a primary synchronization signal (PSS) 2c-41, a secondary synchronization signal (SSS) 2c-43, and a physical broadcast channel (PBCH).

FIG. 2C assumes a scenario in which the SSB is transmitted for each beam. For example, it is assumed that SSB #0 2c-21 is transmitted using beam #0 2c-11, SSB #1 2c-23 is transmitted using beam #1 2c-13, SSB #2 2c-25 is transmitted using beam #2 2c-15, and SSB #3 2c-27 is transmitted using beam #3 2c-17. Although it is assumed that the UE 2c-03 in the idle mode is located in beam #1 2c-13 in FIG. 2C, the UE selects the SSB received at a time point at which random access is performed even when the UE in the connected mode performs random access.

Accordingly, in FIG. 2C, the UE 2c-03 receives SSB #1 2c-23 transmitted through beam #1 2c-13. Upon receiving SSB #1 2c-23, the UE 2c-03 may acquire a physical cell identifier (PCI) of the base station 2c-01 through a PSS and an SSS and receive a PBCH and thus identify an identifier of a currently received SSB (that is, #1), the location at which the current SSB is received within a frame of 10 ms, and a System Frame Number (SFN) of the SSB within an SFN having a period of 10.24 seconds. The PBCH may include a Master Information Block (MIB) and provide information indicating the location at which System Information Block type 1 (SIB1) for broadcasting more detailed cell configuration information is received through the MIB. Upon receiving SIB1, the UE 2c-03 may know the total number of SSBs transmitted by the base station 2c-01 and detect the location of physical random access channel (PRACH) occasion for performing random access (more specifically, transmitting a preamble which is a physical signal specially designed to perform uplink synchronization) in order to switch to the connected-mode state (FIG. 2C assumes a scenario of allocation every 1 ms: from 2c-30 to 2c-39). Further, the UE may know the mapped PRACH occasion among the PRACH occasions and the SSB index to which the PRACH occasion is mapped on the basis of the information. For example, FIG. 2C assumes a scenario in which the PRACH occasion is allocated every 1 ms and a scenario in which ½ SSBs are allocated per PRACH occasion (that is, 2 PRACH occasions per SSB). Accordingly, FIG. 2C illustrates the scenario in which 2 RPACH occasions are allocated per SSB from the beginning of the PRACH occasion starting according to the SFN. That is, reference numerals 2c-30 and 2c-31 are scenarios corresponding to allocation for SSB #1 2c-21, and reference numerals 2c-32 and 2c-33 are scenarios corresponding to SSB #1 2c-23. After the PRACH occasions are configured for all SSBs, the PRACH occasion is allocated for the first SSB again as indicated by reference numerals 2c-38 and 2c-39.

Accordingly, the UE 2c-03 recognizes the location of PRACH occasions 2c-32 and 2c-33 for SSB #1 2c-23, and accordingly transmits a random access preamble on the fastest PRACH occasion 2c-32 at this point in time among the PRACH occasions 2c-32 and 2c-33 corresponding to SSB #1 2c-23 (for example, 2c-32). The base station 2c-01 received the preamble in the PRACH occasion 2c-32 and thus may know that the corresponding UE 2c-03 selected SSB #1 2c-23 and transmitted the preamble, and accordingly transmit and receive data through the corresponding beam in the following random access.

Figure 2D:
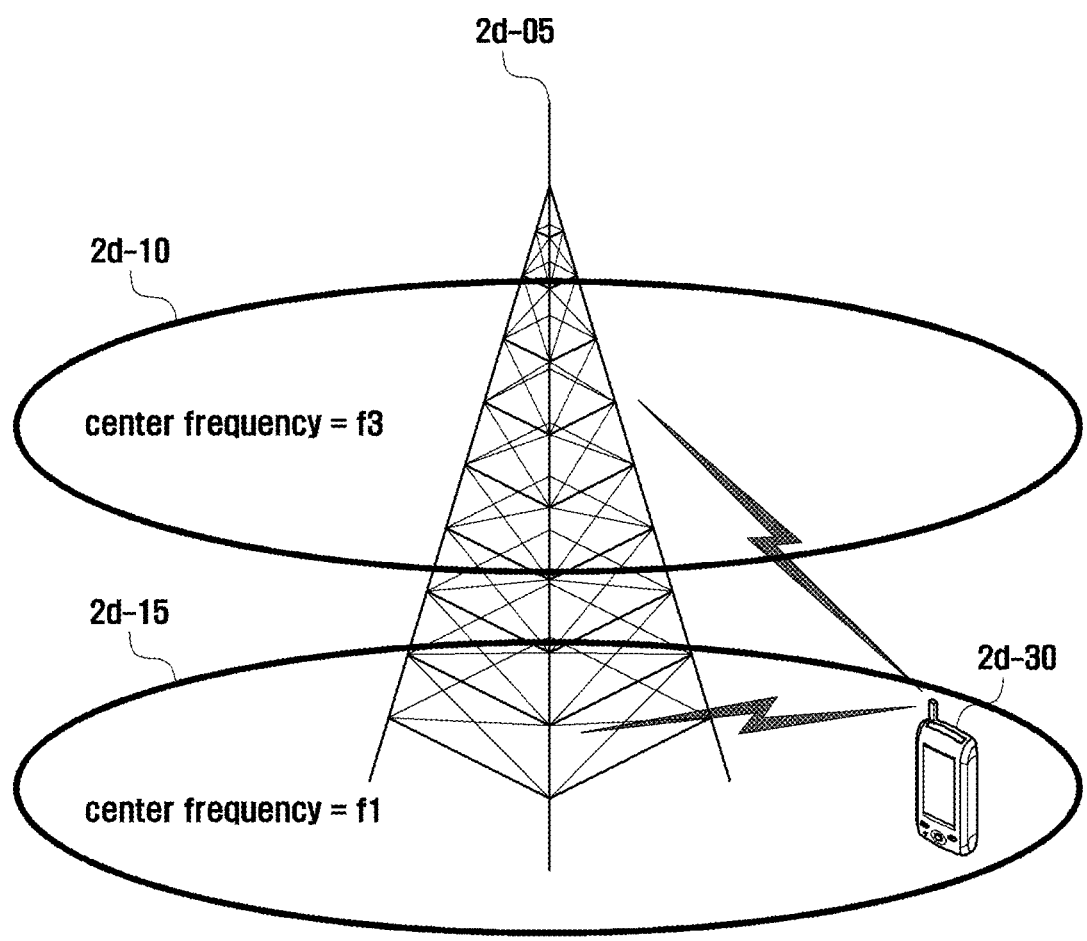
FIG. 2D illustrates carrier aggregation according to an embodiment of the disclosure.

FIG. 2D illustrates carrier aggregation (CA) according to an embodiment of the disclosure.

Referring to FIG. 2D, in one base station, multiple carriers are transmitted and received generally over a plurality of frequency bands. For example, when a base station 2d-05 transmits a carrier 2d-15 having a center frequency f1 and a carrier having a center frequency f3 2d-10, one UE transmits and receives data through one of the two carriers in the prior art. However, the UE 2d-30 having a carrier aggregation capability may simultaneously transmit and receive data through a plurality of carriers. The base station 2d-05 may allocate more carriers to the UE 2d-30 having the carrier aggregation capability according to circumstances, thereby increasing a transmission rate of the UE 2d-30.

If one cell typically includes one forward carrier and one backward carrier transmitted and is received by one base station, the term "carrier aggregation" may be understood as simultaneous transmission and reception of data by the UE through a plurality of cells. Accordingly, a maximum transmission rate increases in proportion to the number of aggregated carriers.

In description of the disclosure below, reception of data through a predetermined forward carrier or transmission of data through a predetermined backward carrier by the UE means transmission and reception of data using a center frequency characterizing the carrier and a control channel and a data channel provided by a cell corresponding to a frequency band. Hereinafter, an embodiment of the disclosure is described on the basis of the LTE system for convenience of description, but the disclosure may be applied to various wireless communication systems supporting carrier aggregation.

Among the two carriers, a cell which the UE initially accesses through random access is referred to as a PCell, and a secondarily added cell is referred to as an SCell. The SCell is added to or released from the UE through a message of an RRC layer, and if the SCell is added through RRC, the corresponding SCell is in a deactivated state. Thereafter, the UE may receive an SCell activation/deactivation MAC control element (CE) from the base station and activate or deactivate the corresponding configured cell. If the UE does not receive scheduling for a predetermined time configured by the base station (for example, a timer corresponding to sCellDeactivationTimer) in the cell activated once, that is, if the corresponding timer expires, the corresponding SCell is deactivated.

In order to activate the deactivated SCell for communication, the base station may have a delay to detect a channel state between the SCell and the UE, and a dormant state, which is an intermediate state between the active state and the inactive state may be defined to reduce the delay. The UE cannot transmit/receive data to/from the SCell in the dormant state, but may periodically report a channel state of the SCell. Accordingly, if the SCell in the dormant state is activated again, it is possible to minimize the delay to communication with the base station.

Meanwhile, when the dormant state is configured or even though the dormant state is not configured, if the SCell is activated again, a method by which the UE reports a channel state according to a short period for a predetermined time and detects the channel state as soon as possible may be used. For example, after a time point (subframe n) at which the UE receives an activation command, the UE may report a channel state to the base station according to a short period configured by the UE from an application time point (for example, subframe n+8) at which the activation command is processed and initially applied to a predetermined time point (for example, subframe n+34).

Accordingly, the UE may perform the following operation according to the state of the SCell.

Figure 2E:
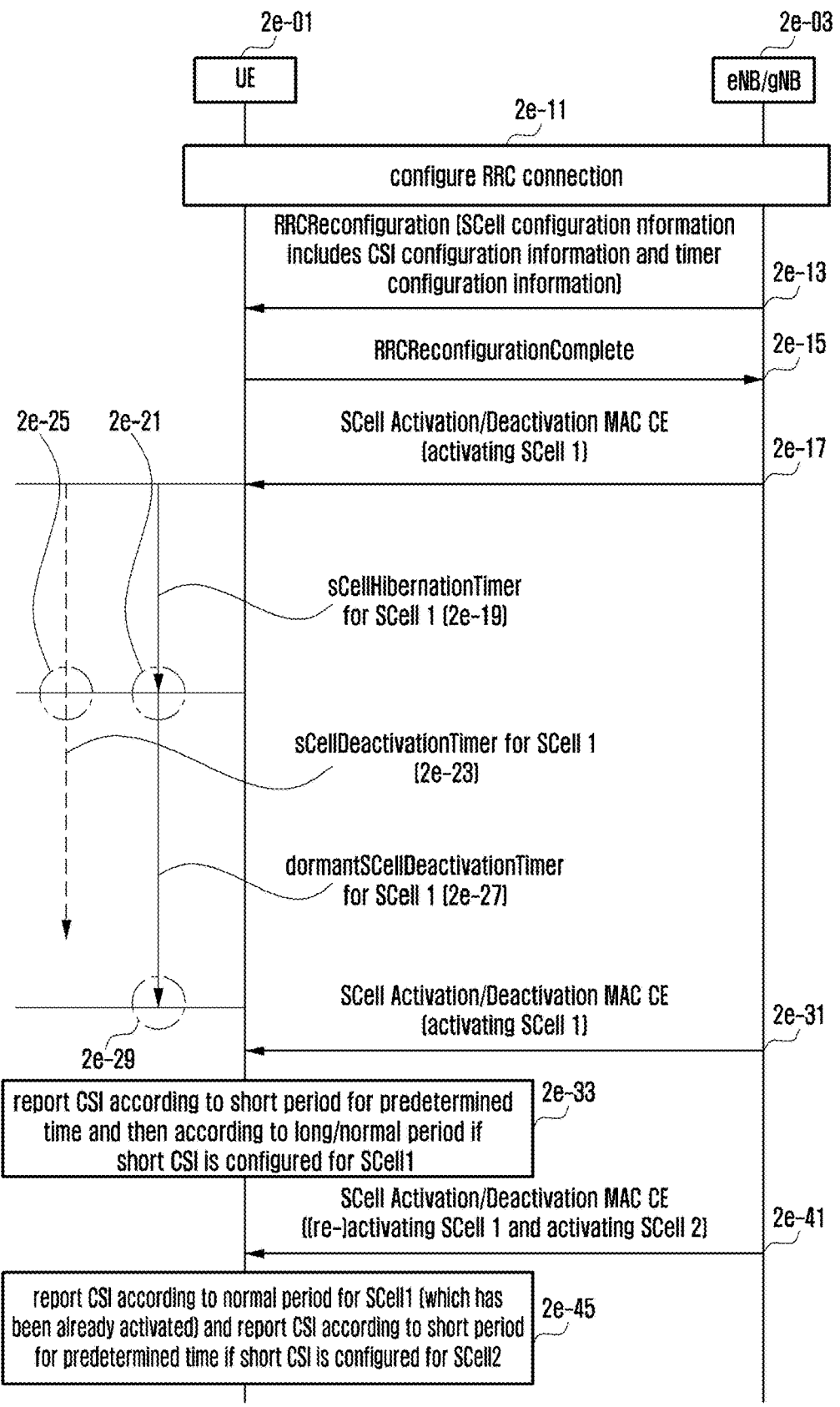
FIG. 2E illustrates the flow of messages between a UE and a base station/gNB when the SCell is operated using carrier aggregation according to an embodiment of the disclosure.

Operation performed in active state
    Transmit sounding reference signal (SRS) to corresponding SCell
    Transmit report on channel state for corresponding SCell (channel quality indicator (CQI)/precoding matrix indicator (PMI)/rank indicator (RI)/precoding type indicator (PTI), and channel state information reference signal (CSI-RS) resource indicator (CRI) are collectively referred as channel state information (CSI)) (to a PCell or a PUCCH SCell) according to short period and normal/long period
    Monitor PDCCH in corresponding SCell or for corresponding SCell
    Transmit PUCCH if PUCCH transmission can be performed in corresponding SCell Operation performed in dormant state
  Transmit no sounding reference signal (SRS) to corresponding SCell
  Transmit report on channel state (CQI/PMI/RI/PTI/CRI are collectively referred to as CSI) for corresponding SCell according to a dormant mode report period (to PCell or PUCCH SCell)
  Perform no PDCCH monitoring
  Perform no uplink transmission in corresponding SCell
Operation performed in inactive state
  Transmit sounding reference signal (SRS) to corresponding SCell
  Transmit no report on channel state (CQI/PMI/RI/PTI/CRI are collectively referred to as CSI) for corresponding SCell
  Perform no PDCCH monitoring
  Perform no uplink transmission in corresponding PCell FIG. 2E illustrates the flow of messages between a UE and a base station when the SCell is operated using carrier aggregation according to an embodiment of the disclosure.

Referring to FIG. 2E, a UE 2e-01 makes a configuration for connection to a base station 2e-03 by accessing the base station 2e-03 in step 2e-11. The connection configuration includes a procedure in which the UE 2e-01 performs random access to the base station 2e-03, transmits an RRC layer connection request message (RRCSetupRequest) to the base station 2e-03, receives a connection message (RRCSetup) from the base station 2e-03, and transmits an acknowledgement message (RRCSetupComplete) to the base station 2e-03.

Thereafter, the base station 2e-03 may transmit various configurations to the UE 2e-01 according to the capability of the UE 2e-01 in step 2e-13. The configuration may include information on addition (or release) of the SCell in addition to the current PCell. If the base station additionally configures the SCell in the UE, the base station may configure a maximum of three periods with respect to a channel state report period for each SCell, and may configure a short period used for activation, a long (or normal) period used for activation, and a period according to which a report is transmitted in the dormant state. Further, the base station may configure timers for the state transmission of the SCell in the UE. The timer may include sCellDeactivationTimer from the active state to the inactive state when expired, sCellHibernationTimer from the active state to the dormant mode state when expired, and dormantSCellDeactivationTimer from the dormant mode state to the inactive state when expired. After receiving the configuration message, the UE 2e-01 transmits an acknowledgement message to the base station 2e-03 in step 2e-15. When the base station 2e-03 configures the SCell, the base station may configure sCellDeactivationTimer if the dormant mode state is not supported, and may not configure sCellDeactivationTimer if the dormant mode state is supported. This is to switch, if there is no data transmission/reception for a predetermined time in the active state, the UE to the idle mode and then to the inactive mode by the base station.

Meanwhile, as described above, in order to activate the SCell, the base station may use the SCell activation/deactivation MAC CE message, and the base station 2e-03 may activate or deactivate the SCell configured in step 2e-13 by transmitting the corresponding MAC CE to the UE 2e-01 in step 2e-17. Alternatively, the base station may indicate the active state or the dormant state event at the beginning through the RRC message 2e-13.

In this scenarios, it is assumed that the base station 2e-03 configures the UE 2e-01 to support the SCell in the dormant state, and accordingly, if the SCell is activated, the UE 2e-01 starts the configured sCellDeactivationTimer and sCellHibernationTimer in steps 2e-19 and 2e-23. As described above, the base station 2e-03 may not configure sCellDeactivationTimer in this scenario. In this case, the UE 2e-01 starts only sCellHibernationTimer in step 2e-19.

Thereafter, if the UE receives resource allocation for downlink data transmission or uplink data transmission in the corresponding SCell, if the UE receives resource allocation for downlink data transmission or uplink data transmission for the corresponding SCell in another PCell/SCell, or if there is configured downlink or uplink data transmission/reception of the SCell, the UE 2e-01 restarts sCellDeactivationTimer and sCellHibernationTimer.

Thereafter, when no activity is generated and thus sCellHibernationTimer expires in step 2e-21, if sCellDeactivationTimer 2e-23 is configured in the corresponding SCell, the UE 2e-01 stops the sCellDeactivationTimer in step 2e-25. If the sCellHibernationTimer has expired in step 2e-21, the UE 2e-01 starts the configured dormantSCellDeactivationTimer in step 2e-27. Accordingly, the UE 2e-01 considers that the corresponding SCell is in the dormant state and reports a channel state according to a period used in the dormant state when the channel state is reported.

Thereafter, if the UE 2e-01 does not receive an indication of the active state or the dormant mode state from the base station 2e-03 through the SCell activation/deactivation MAC CE message (or through an RRC message) until the dormantSCellDeactivationTimer 2e-27 has expired in step 2e-29, the UE 2e-01 deactivate the corresponding SCell and performs an operation that is performed during deactivation. The operation includes the content of "the operation performed in the inactive state".

Meanwhile, the period according to which the UE reports CSI is additionally described in detail. That is, CSI report-related content described below is equally applied to the above-described operation. To this end, a scenario in which the base station 2e-03 activates SCell 1 (deactivated according to the procedure) again is described in step 2e-31. That is, the UE 2e-01 receives an indication of activation of SCell 1 from the base station 2e-03 through the SCell activation/deactivation MAC CE in step 2e-31. At this time, it is assumed that the short CSI report period used for activation of the corresponding SCell is configured, and accordingly, the UE 2e-01 reports the CSI according to the short period for a predetermined time and then report the CSI according to a long/normal period after the corresponding time in step 2e-33. The predetermined timer may be, for example, from a time point at which an activation command is processed and initially applied (for example, subframe n+8) after a time point at which the activation command is received (for example, subframe n) to a predetermined time (for example, subframe n+34).

In the state in which SCell 1 is activated, the UE 2e-01 receives an indication of (re)activation of SCell 1 and activation of SCell 2 from the base station 2e-03 through the SCell activation/deactivation MAC CE message in step 2e-41. At this time, since SCell 1 has been already activated, CSI is reported to the base station 2e-03 according to a long/normal period rather than reporting using a short period even though the short period is configured. However, since SCell 2 is deactivated, if the short CSI is configured, the UE 2e-01 transmits a report according to the short period for a predetermined time as described above in step 2e-45.

Figure 2F:
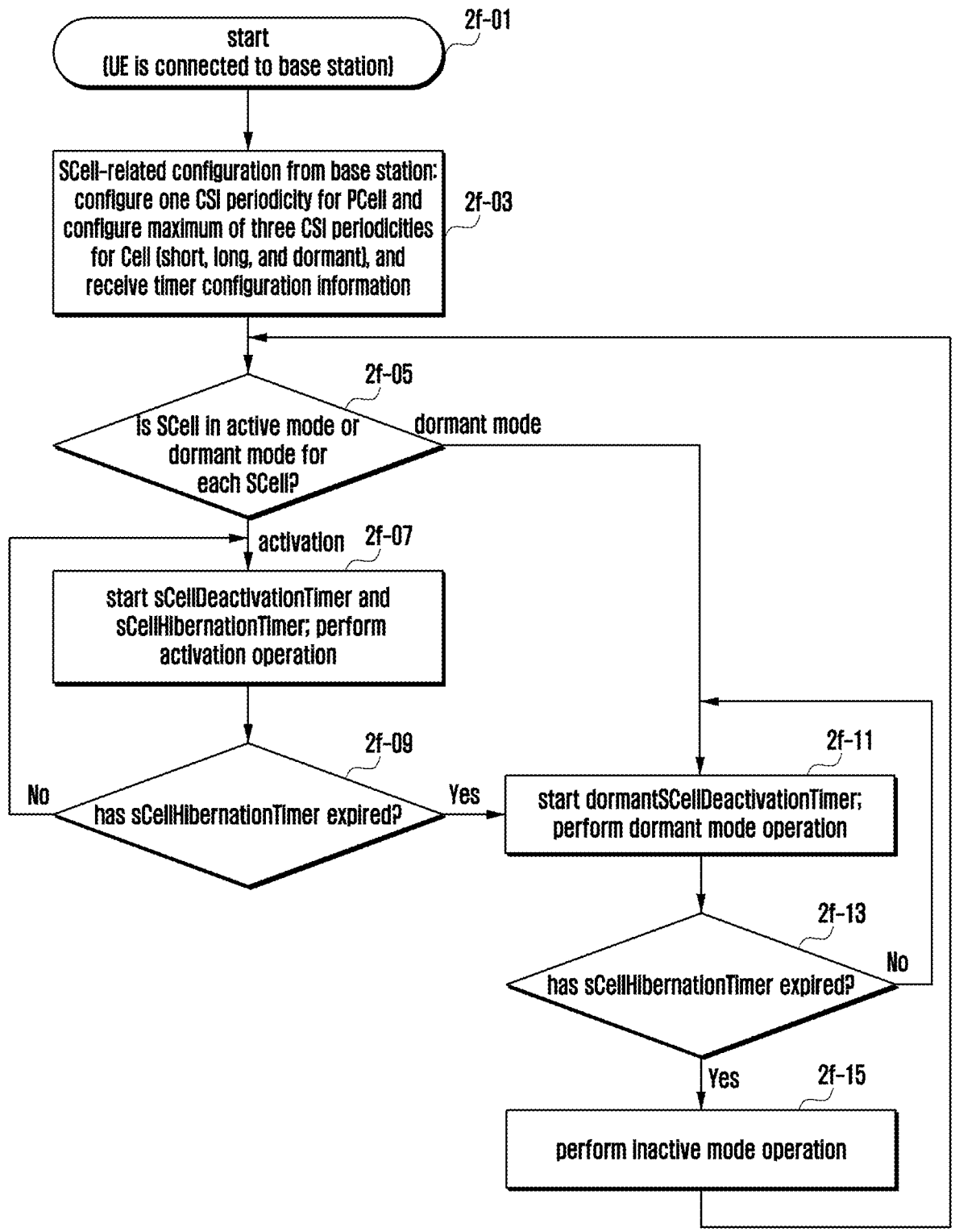
FIG. 2F illustrates a flowchart of the operation of the UE for managing an SCell state when the SCell is operated using carrier aggregation according to an embodiment of the disclosure.

FIG. 2F illustrates a flowchart of the operation of the UE for managing an SCell state when the SCell is operated through the application of carrier aggregation according to an embodiment of the disclosure.

FIG. 2F assumes a situation after the UE accesses the base station and makes a configuration of connection to the base station in step 2f-01.

Thereafter, the UE may receive various configurations from the base station through an RRC layer message in step 2f-03. The configuration may include a configuration of adding (or releasing) the SCell in addition to the current PCell. Further, the configuration may additionally include a configuration indicating whether to use a dormant mode as well as an active/inactive mode for the corresponding SCell by the base station and a configuration of a timer related to the dormant mode operation. The timer may include sCell-DeactivationTimer from the active state to the inactive state when expired, sCellHibernationTimer from the active state to the dormant mode state when expired, and dormantSCell-DeactivationTimer from the dormant mode state to the inactive state when expired. In order to report a channel state for each cell, the UE may receive a configuration of one CSI report period for the PCell, and if the SCell is additionally configured, may receive a configuration of a maximum of three CSI report periods for each SCell. The three periods include a short period used in the active state, a long (or normal) period used in the active state, and a period according to which a report is transmitted in the dormant state. The configuration may include initial state information of the corresponding SCell, and the base station may simultaneously configure and activate the SCell through the configuration or operate the SCell in the dormant mode.

After receiving the configuration message, the UE transmits an acknowledgement message to the base station through an RRC layer message.

As described above, it is assumed that, when receiving the RRC layer configuration message from the base station, the UE may receive the active mode or the dormant mode as an initial state of the SCell or the UE may receive the active mode or the dormant mode as the state of the SCell through a separate SCell activation/deactivation MAC CE message in step 2f-05.

If the UE receives an indication of activation of the SCell from the base station, the UE starts the configured sCell-DeactivationTimer and sCellHibernationTimer and performs the "operation that performed in the active state" in step 2f-07.

Thereafter, if the UE receives resource allocation for downlink data transmission or uplink data transmission in the corresponding SCell, if the UE receives resource allocation for downlink data transmission or uplink data transmission for the corresponding SCell in another PCell/SCell, or if there is configured downlink or uplink data transmission/reception of the SCell, the UE restarts sCellDeactivationTimer and sCellHibernationTimer.

Thereafter, when no activity is generated and thus sCellHibernationTimer expires in step 2f-09, if sCellDeactivationTimer is configured in the corresponding SCell, the UE stops the sCellDeactivationTimer. If the sCellHibernationTimer has expired, the UE starts the configured dormantSCellDeactivationTimer and performs the "operation that is performed in the dormant state" in step 2f-11. That is, accordingly, the UE considers that the corresponding SCell is in the dormant state and reports a channel state according to a period used in the dormant state when the channel state is reported.

Thereafter, if the UE does not receive an indication of the active state or the dormant mode state from the base station through the SCell activation/deactivation MAC CE message (or through an RRC message) until the dormantSCellDeactivationTimer expires in step 2f-13, the UE deactivate the corresponding SCell and performs "the operation that is performed in the inactive state" in step 2f-15.

FIG. 2G illustrates a flowchart of the operation of the UE for a CSI report when the SCell is operated when carrier aggregation is used according to an embodiment of the disclosure.

FIG. 2G assumes a situation after the UE accesses the base station and makes a configuration of connection to the base station in step 2g-01.

Thereafter, the UE may receive various configurations from the base station through an RRC layer message in step 2g-03. The configuration may include a configuration of adding (or releasing) the SCell in addition to the current PCell. Further, the configuration may additionally include a configuration indicating whether to use a dormant mode as well as an active/inactive mode for the corresponding SCell by the base station and a configuration of a timer related to the dormant mode operation. The timer may include sCell-DeactivationTimer from the active state to the inactive state when expired, sCellHibernationTimer from the active state to the dormant mode state when expired, and dormantSCell-DeactivationTimer from the dormant mode state to the inactive state when expired. In order to report a channel state for each cell, the UE may receive a configuration of one CSI report period for the PCell, and if the SCell is additionally configured, may receive a configuration of a maximum of three CSI report periods for each SCell. The three periods include a short period used for activation, a long (or normal) period used for activation, and a period according to which a report is transmitted in the dormant state. The configuration may include initial state information of the corresponding SCell, and the base station may simultaneously configure and activate the SCell through the configuration or operate the SCell in the dormant mode.

After receiving the configuration message, the UE transmits an acknowledgement message to the base station through an RRC layer message.

As described above, it is assumed that, when receiving the RRC layer configuration message from the base station, the UE may receive the active mode or the dormant mode as an initial state of the SCell or the UE may receive the active mode or the dormant mode as the state of the SCell through a separate SCell activation/deactivation MAC CE message in step 2f-05.

If the UE receives an indication of activation of the SCell from the base station, if the corresponding SCell previously operated in the inactive state or the dormant mode state in step 2g-07, and if a report based on a short period is configured in the UE during activation, the UE reports CSI according to the short period for a predetermined time step 2g-09. The predetermined timer may be, for example, from a time point at which an activation command is processed and initially applied (for example, subframe n+8) after a time point at which the activation command is received (for example, subframe n) to a predetermined time (for example, subframe n+34). After the predetermined time in step 2g-11, the UE reports CSI according to the long/normal period in step 2g-13.

If the UE receives an indication of activation of the SCell from the base station but the report based on the short period is not configured, the UE reports CSI according to the long/normal period in step 2g-13.

Meanwhile, if the UE receives an indication of activation again for the activated SCell from the base station through the SCell activation/deactivation MAC CE message in step 2g-07, the UE reports CSI according to the long/normal period even though the short period is configured in step 2g-13.

Further, if the UE receives an indication of operating the SCell in the dormant mode from the base station, the UE report a channel state to the base station according to report period configuration information in the dormant mode in step 2g-15.

Figure 2H:
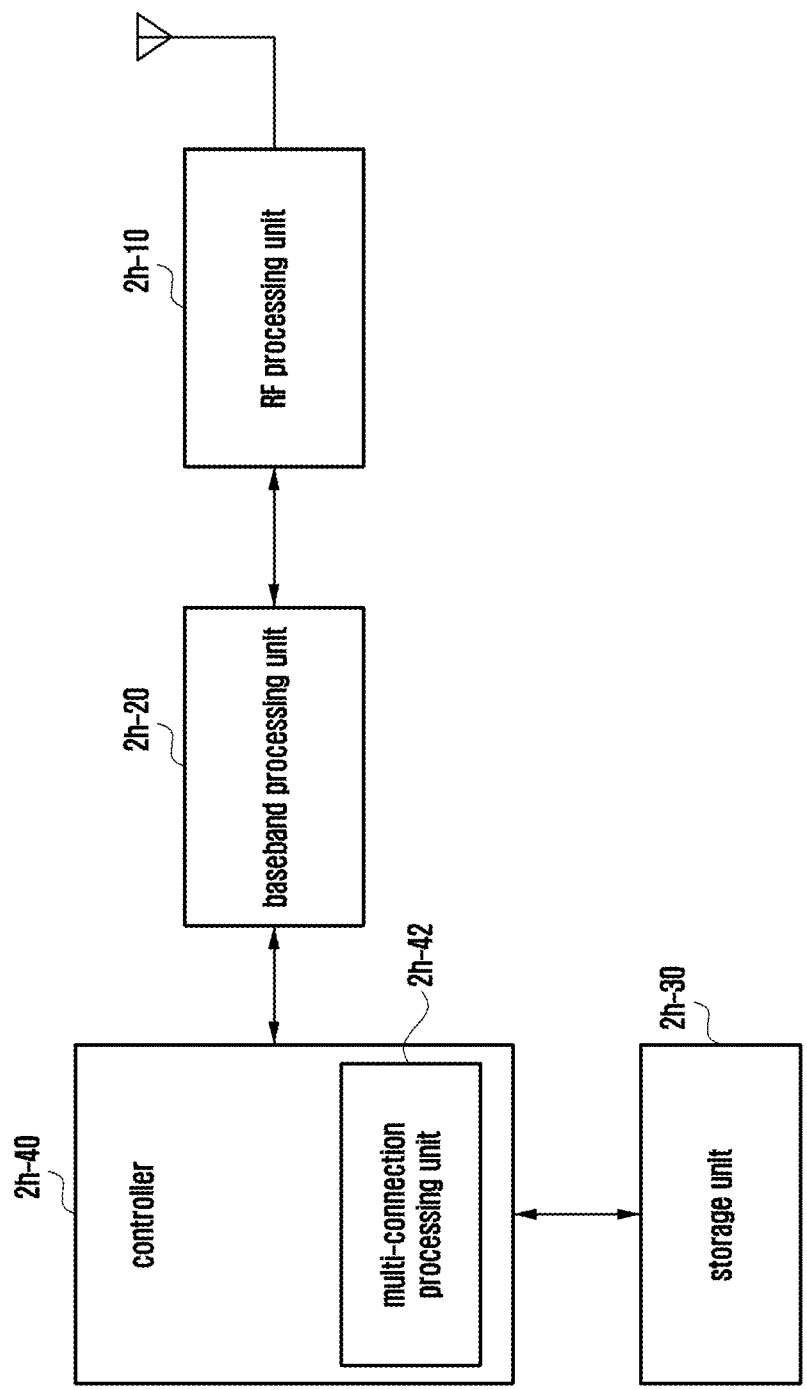
FIG. 2H illustrates a block diagram of a UE in a wireless communication system according to an embodiment of the disclosure.

FIG. 2H illustrates a block diagram of a UE in a wireless communication system according to an embodiment of the disclosure.

Referring to FIG. 2H, the UE includes a radio-frequency (RF) processing unit 2h-10, a baseband processing unit 2h-20, a storage unit 2h-30, and a controller 2h-40.

The RF processing unit 2h-10 performs a function for transmitting and receiving a signal through a wireless channel, such as band conversion and amplification of a signal. That is, the RF processing unit 2h-10 up-converts a baseband signal provided from the baseband processing unit 2h-20 into an RF band signal, transmits the converted signal through an antenna, and down-converts the RF band signal received through the antenna into a baseband signal. For example, the RF processing unit 2h-10 may include a transmission filter, a reception filter, an amplifier, a mixer, an oscillator, a digital-to-analog convertor (DAC), an analog-to-digital convertor (ADC), and the like. Although only one antenna is illustrated in FIG. 2H, the UE may include a plurality of antennas. The RF processing unit 2h-10 may include a plurality of RF chains. Moreover, the RF processing unit 2h-10 may perform beamforming. For the beamforming, the RF processing unit 2h-10 may control a phase and a size of each of the signals transmitted/received through a plurality of antennas or antenna elements.

The baseband processing unit 2h-20 performs a function for a conversion between a baseband signal and a bitstream according to a physical layer standard of the system. For example, in data transmission, the baseband processing unit 2h-20 generates complex symbols by encoding and modulating a transmission bitstream. Further, in data reception, the baseband processing unit 2h-20 reconstructs a reception bitstream by demodulating and decoding a baseband signal provided from the RF processing unit 2h-10. For example, in an orthogonal frequency division multiplexing (OFDM) scheme, when data is transmitted, the baseband processing unit 2h-20 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processing unit 2h-20 divides the baseband signal provided from the RF processor 2h-10 in the unit of OFDM symbols, reconstructs the signals mapped to the subcarriers through a fast Fourier transform (FFT) operation, and then reconstructs a reception bitstream through demodulation and decoding.

The baseband processing unit 2h-20 and the RF processing unit 2h-10 may transmit and receive signals as described above. Accordingly, the baseband processing unit 2h-20 or the RF processing unit 2h-10 may be referred to as a transmitter, a receiver, a transceiver, or a communication unit. At least one of the baseband processing unit 2h-20 and the RF processing unit 2h-10 may include a plurality of communication modules to support a plurality of different radio access technologies. Further, at least one of the baseband processing unit 2h-20 and the RF processing unit 2h-10 may include a plurality of communication modules to process signals of different frequency bands. For example, the different radio access technologies may include a wireless LAN (for example, IEEE 802.11) and a cellular network (for example, LTE). Further, the different frequency bands may include a Super High Frequency (SHF) (for example, 2.5 GHz and 5 Ghz) band and a millimeter (mm) wave (for example, 60 GHz) band.

The storage unit 2h-30 stores data such as a basic program, an application program, and setting information for the operation of the UE. Particularly, the storage unit 2h-30 may store information related to a wireless LAN node that performs wireless communication using a wireless LAN access technology. The storage unit 2h-30 provides stored data according to a request from the controller 2h-40.

The controller 2h-40 controls the overall operation of the UE. For example, the controller 2h-40 transmits and receives a signal through the baseband processing unit 2h-20 and the RF processing unit 2h-10. Further, the controller 2h-40 records data in the storage unit 2h-40 and reads the data. To this end, the controller 2h-40 may include at least one processor. For example, the controller 2h-40 may include a communication processor (CP) that performs a control for communication, and an application processor (AP) that controls a higher layer such as an application. According to an embodiment of the disclosure, the controller 2h-40 includes a multi-connection processing unit 2h-42 that performs processing for the operation in a multi-connection mode. For example, the controller 2h-40 may control the UE to perform the procedure corresponding to the operation of the UE illustrated in FIGS. 2E, 2F, and 2G.

The controller 2h-40 according to an embodiment of the disclosure performs an activation/idle mode/deactivation operation in the SCell configured according to an indication of the base station and performs an operation for indicating transmission of the state.

Figure 2I:
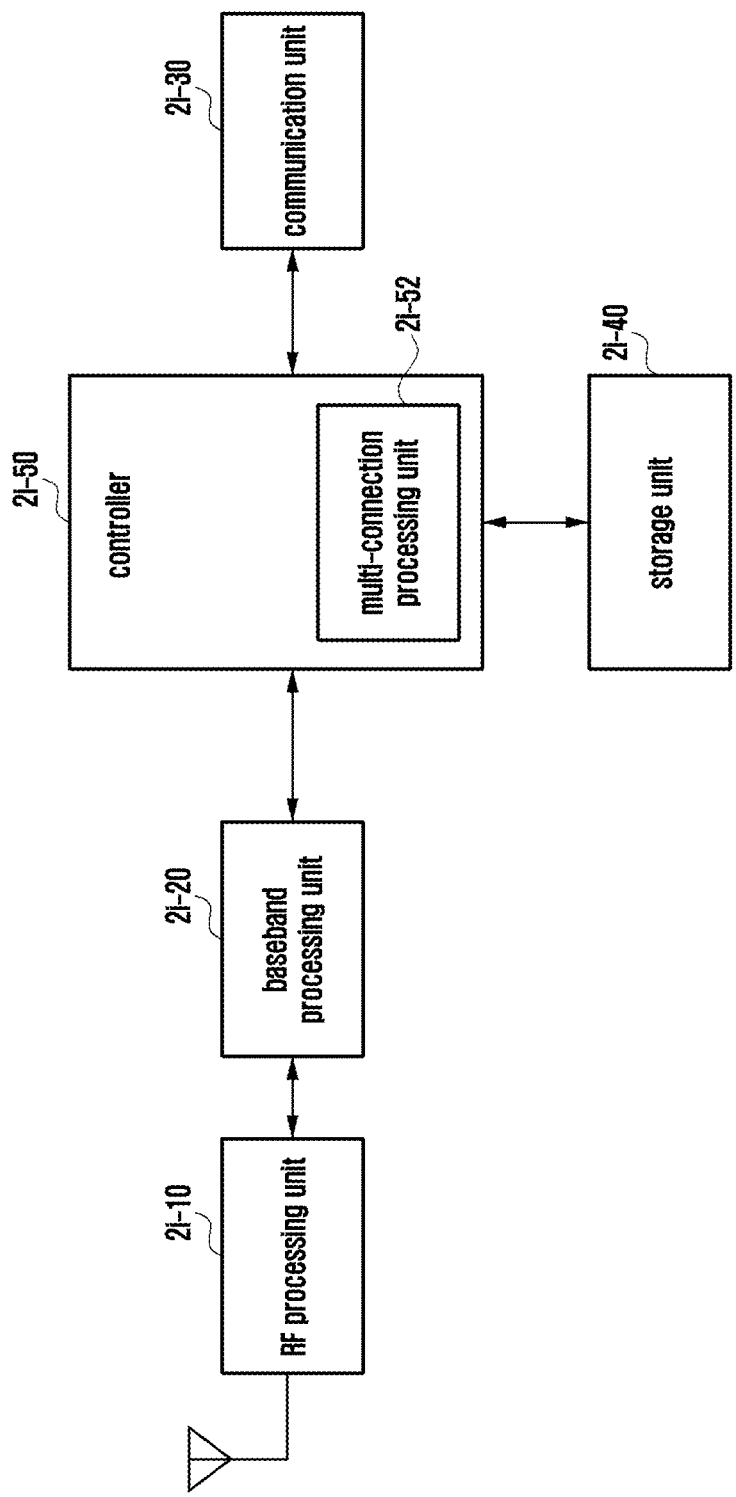
FIG. 2I illustrates a block diagram of a base station in a wireless communication system according to an embodiment of the disclosure.

FIG. 2I illustrates a block diagram of a base station in a wireless communication system according to an embodiment of the disclosure.

Referring to FIG. 2I, the base station includes an RF processing unit 2i-10, a baseband processing unit 2i-20, a backhaul communication unit 2i-30, a storage unit 2i-40, and a controller 2i-50.

The RF processing unit 2i-10 performs a function for transmitting and receiving a signal through a wireless channel, such as band conversion and amplification of a signal. That is, the RF processing unit 2i-10 up-converts a baseband signal provided from the baseband processing unit 2i-20 into an RF band signal, transmits the converted signal through an antenna, and down-converts an RF band signal received through the antenna into a baseband signal. For example, the RF processing unit 2i-10 may include a transmission filter, a reception filter, an amplifier, a mixer, an oscillator, a DAC, and an ADC. Although FIG. 2I illustrates only one antenna, the first access node may include a plurality of antennas. The RF processing unit 2i-10 may include a plurality of RF chains. The RF processing unit 2i-10 may perform beamforming. For the beamforming, the RF processing unit 2i-10 may control a phase and a size of each of the signals transmitted and received through a plurality of antennas or antenna elements. The RF processing unit may perform a downlink MIMO operation by transmitting one or more layers.

The baseband processing unit 2i-20 performs a function of conversion between a baseband signal and a bitstream according to a physical-layer standard of the first radio access technology. For example, in data transmission, the baseband processing unit 2i-20 generates complex symbols by encoding and modulating a transmission bitstream. Further, in data reception, the baseband processing unit 2i-20 reconstructs a reception bitstream by demodulating and decoding a baseband signal provided from the RF processing unit 2i-10. For example, in an OFDM scheme, when data is transmitted, the baseband processing unit 2i-20 may generate complex symbols by encoding and modulating the transmission bitstream, map the complex symbols to sub-carriers, and then configure OFDM symbols through an IFFT operation and CP insertion. In addition, when data is received, the baseband processing unit 2i-20 divides a baseband signal provided from the RF processing unit 2i-10 in units of OFDM symbols, recovers signals mapped with subcarriers through an FFT operation, and then recovers a reception bitstream through demodulation and decoding. The baseband processing unit 2i-20 and the RF processing unit 2i-10 transmit and receive signals as described above. Accordingly, the baseband processing unit 2i-20 or the RF processing unit 2i-10 may be referred to as a transmitter, a receiver, a transceiver, a communication unit, or a wireless communication unit.

The backhaul communication unit 2i-30 provides an interface for communicating with other nodes within the network. That is, the backhaul communication unit 2i-30 converts a bitstream transmitted to another node, for example, the secondary base station or a core network from the master base station, into a physical signal and converts a physical signal received from the other node into the bitstream.

The storage unit 2i-40 stores data such as a basic program, an application, and configuration information for the operation of the master base station. Particularly, the storage unit 2i-40 may store information on bearers allocated to the accessed UE and a measurement result reported from the accessed UE. Further, the storage unit 2i-40 may store information that is a reference for determining whether to provide multiple connections to the UE or stopping the connections. The storage unit 2i-40 provides stored data according a request from the controller 2i-50.

The controller 2i-50 controls the overall operations of the master base station. For example, the controller 2i-50 transmits and receives a signal through the baseband processing unit 2i-20 and the RF processing unit 2i-10 or through the backhaul communication unit 2i-30. The controller 2i-50 records data in the storage unit 2i-40 and reads the data. To this end, the controller 2i-50 may include at least one processor.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, configuration information for a secondary cell (SCell), wherein, in case that the terminal supports a dormant state, the configuration information includes information on a hibernation timer and information on a periodicity of a channel state information (CSI) reporting, wherein the periodicity associated with an activated state for the SCell includes a first periodicity and a second periodicity;
   identifying whether the SCell is in the activated state;
   in case that the SCell is in the activated state, starting the hibernation timer, wherein the CSI reporting is performed based on the first periodicity or the second periodicity;
   entering the dormant state based on an expiration of the hibernation timer;
   receiving, from the base station, an activation command for the SCell;
   entering the activated state from the dormant state based on the activation command; and
   performing the CSI reporting based on the second periodicity,
   wherein the second periodicity is longer than the first periodicity, and
   wherein, in case that the terminal does not support the dormant state, the configuration information includes information on a SCell deactivation timer.

2. The method of claim 1, further comprising performing the CSI reporting on the SCell, during the dormant state.

3. The method of claim 1, further comprising:
   deactivating the SCell based on an expiration of a dormant SCell deactivation timer; and
   stopping the dormant SCell deactivation timer based on the expiration of the dormant SCell deactivation timer,
   wherein the configuration information includes information on the dormant SCell deactivation timer.

4. The method of claim 1,
wherein, while the SCell is in the activated state, the hibernation timer is restarted, in case that an uplink grant or a downlink assignment is received on the SCell.

5. The method of claim 1, wherein the configuration information is received through a radio resource control (RRC) message or a medium access control control element (MAC CE).

6. A method performed by a base station in a wireless communication system, the method comprising:
transmitting, to a terminal, configuration information for a secondary cell (SCell), wherein, in case that the terminal supports a dormant state, the configuration information includes information on a hibernation timer and information on a periodicity of a channel state information (CSI) reporting, wherein the periodicity associated with an activated state for the SCell includes a first periodicity and a second periodicity; and
transmitting, to the terminal, an activation command for the SCell while the terminal is in the dormant state for the SCell,
wherein, in case that the SCell is in the activated state, the CSI reporting is performed based on the first periodicity or the second periodicity,
wherein, in case that the hibernation timer is expired, the terminal enters the dormant state for the SCell,
wherein, in case that the SCell is in the activated state based on the activation command, the CSI reporting is performed based on the second periodicity,
wherein the second periodicity is longer than the first periodicity, and
wherein, in case that the terminal does not support the dormant state, the configuration information includes information on a SCell deactivation timer.

7. The method of claim 6,
wherein the CSI reporting is performed on the SCell, during the dormant state.

8. The method of claim 6,
wherein the SCell is deactivated based on an expiration of a dormant SCell deactivation timer,
wherein the dormant SCell deactivation timer is stopped based on the expiration of the dormant SCell deactivation timer, and
wherein the configuration information includes information on the dormant SCell deactivation timer.

9. The method of claim 6,
wherein, while the SCell is in the activated state, the hibernation timer is restarted, in case that an uplink grant or a downlink assignment is received on the SCell.

10. The method of claim 6, wherein the configuration information is transmitted through a radio resource control (RRC) message or a medium access control control element (MAC CE).

11. A terminal in a wireless communication system, the terminal comprising:
a transceiver configured to transmit and receive a signal; and
a processor configured to:
receive from a base station, configuration information for a secondary cell (SCell), wherein, in case that the terminal supports a dormant state, the configuration information includes information on a hibernation timer and information on a periodicity of a channel state information (CSI) reporting, wherein the periodicity associated with an activated state for the SCell includes a first periodicity and a second periodicity;
identify whether the SCell is in the activated state;
in case that the SCell is in the activated state, start the hibernation timer, wherein the CSI reporting is performed based on the first periodicity or the second periodicity;
enter the dormant state based on an expiration of the hibernation timer;
receive, from the base station, an activation command for the SCell;
enter the activated state from the dormant state based on the activation command; and
perform the CSI reporting based on the second periodicity,
wherein the second periodicity is longer than the first periodicity, and
wherein, in case that the terminal does not support the dormant state, the configuration information includes information on a SCell deactivation timer.

12. The terminal of claim 11, wherein the processor is further configured to perform the CSI reporting on the SCell during the dormant state.

13. The terminal of claim 11, wherein the processor is further configured to:
deactivate the SCell based on an expiration of a dormant SCell deactivation timer; and
stop the dormant SCell deactivation timer based on the expiration of the dormant SCell deactivation timer,
wherein the configuration information includes information on the dormant SCell deactivation timer.

14. The terminal of claim 11,
wherein, while the SCell is in the activated state, the hibernation timer is restarted, in case that an uplink grant or a downlink assignment is received on the SCell.

15. The terminal of claim 11, wherein the configuration information is received through a radio resource control (RRC) message or a medium access control control element (MAC CE).

16. A base station in a wireless communication system, the base station comprising:
a transceiver configured to transmit and receive a signal; and
a processor configured to:
transmit, to a terminal, configuration information for a secondary cell (SCell), wherein, in case that the terminal supports a dormant state, the configuration information includes information on a hibernation timer and information on a periodicity of a channel state information (CSI) reporting, wherein the periodicity associated with an activated state for the SCell includes a first periodicity and a second periodicity; and
transmit, to the terminal, an activation command for the SCell while the terminal is in the dormant state for the SCell,
wherein, in case that the SCell is in the activated state, the CSI reporting is performed based on the first periodicity or the second periodicity,
wherein, in case that the hibernation timer is expired, the terminal enters the dormant state for the SCell,
wherein, in case that the SCell is in the activated state based on the activation command, the CSI reporting is performed based on the second periodicity, wherein the second periodicity is longer than the first periodicity, and wherein, in case that the terminal does not support the dormant state, the configuration information includes information on a SCell deactivation timer.

17. The base station of claim 16, wherein the CSI reporting is performed on the SCell, during the dormant state.

18. The base station of claim 16, wherein the SCell is deactivated based on an expiration of a dormant SCell deactivation timer, wherein the dormant SCell deactivation timer is stopped based on the expiration of the dormant SCell deactivation timer, and wherein the configuration information includes information on the dormant SCell deactivation timer.

19. The base station of claim 16, wherein, while the SCell is in the activated state, the hibernation timer is restarted, in case that an uplink grant or a downlink assignment is received on the SCell.

20. The base station of claim 16, wherein the configuration information is transmitted through a radio resource control (RRC) message or a medium access control control element (MAC CE).

\* \* \* \* \*